United States Patent
Ishihara

(10) Patent No.: US 11,239,530 B2
(45) Date of Patent: Feb. 1, 2022

(54) MICROPOROUS MEMBRANE LITHIUM ION SECONDARY BATTERY AND METHOD OF PRODUCING THE MICROPOROUS MEMBRANE

(71) Applicant: Toray Industries, Inc., Tokyo (JP)

(72) Inventor: Takeshi Ishihara, Tochigi (JP)

(73) Assignee: Toray Industries, Inc., Tokyo (JP)

( * ) Notice: Subject to any disclaimer, the term of this patent is extended or adjusted under 35 U.S.C. 154(b) by 308 days.

(21) Appl. No.: 16/329,318

(22) PCT Filed: Aug. 25, 2017

(86) PCT No.: PCT/JP2017/030538
§ 371 (c)(1),
(2) Date: Feb. 28, 2019

(87) PCT Pub. No.: WO2018/043331
PCT Pub. Date: Mar. 8, 2018

(65) Prior Publication Data
US 2019/0252664 A1 Aug. 15, 2019

(30) Foreign Application Priority Data

Aug. 29, 2016 (JP) .............................. JP2016-167382
Aug. 29, 2016 (JP) .............................. JP2016-167383

(51) Int. Cl.
*H01M 2/16* (2006.01)
*C08J 9/26* (2006.01)
(Continued)

(52) U.S. Cl.
CPC ............. *H01M 50/411* (2021.01); *C08J 9/00* (2013.01); *C08J 9/26* (2013.01); *H01M 10/0525* (2013.01);
(Continued)

(58) Field of Classification Search
CPC .......... B01D 2311/103; B01D 2323/12; B01D 2323/18; B01D 2325/028; B01D 2325/04;
(Continued)

(56) References Cited

U.S. PATENT DOCUMENTS 10,486,112 B2  11/2019  Mizuno et al.
2010/0009265 A1  1/2010  Hatayama et al.
(Continued)

FOREIGN PATENT DOCUMENTS

EP      2 866 278 A1    4/2015
JP      2007-262203 A   10/2007
(Continued)

OTHER PUBLICATIONS

The Extended European Search Report dated Mar. 13, 2020, of counterpart European Application No. 17846336.0.

*Primary Examiner* — Lingwen R Zeng
(74) *Attorney, Agent, or Firm* — DLA Piper LLP (US)

(57) ABSTRACT

A method suppresses membrane thickness variation and air resistance variation after a compression at 60° C. or 80° C. Stretching is performed at least twice in at least different axial directions before the extraction of the solvent, and at the same time, at least one of (i) and (ii) is satisfied. (i) The step (c) is a first stretching step of stretching the sheet-shaped product at least once in a sheet transport direction (MD direction) and at least once in a sheet width direction (TD direction) individually, and the MD stretching magnification and the TD stretching magnification in the step (c) satisfy (TD stretching magnification≥MD stretching magnification−2). (ii) The stretching temperature (T1) of a first axial stretching performed firstly in the step (c) and the maximal stretching temperature (T2) of a second stretching performed after the first axial stretching satisfy (T1−T2≥0).

10 Claims, 3 Drawing Sheets

(51) Int. Cl.
*H01M 10/0525* (2010.01)
*H01M 50/411* (2021.01)
*C08J 9/00* (2006.01)
*H01M 50/409* (2021.01)
*H01M 50/431* (2021.01)
*B01D 67/00* (2006.01)
*B01D 69/02* (2006.01)
*B01D 71/26* (2006.01)

(52) U.S. Cl.
CPC ....... *H01M 50/409* (2021.01); *H01M 50/431* (2021.01); *B01D 67/0025* (2013.01); *B01D 67/0027* (2013.01); *B01D 69/02* (2013.01); *B01D 71/26* (2013.01); *B01D 2311/103* (2013.01); *B01D 2323/12* (2013.01); *B01D 2323/18* (2013.01); *B01D 2325/028* (2013.01); *B01D 2325/04* (2013.01); *B01D 2325/20* (2013.01); *B01D 2325/22* (2013.01); *B01D 2325/24* (2013.01); *Y02E 60/10* (2013.01)

(58) Field of Classification Search
CPC ............ B01D 2325/20; B01D 2325/22; B01D 2325/24; B01D 67/0025; B01D 67/0027; B01D 69/02; B01D 71/26; C08J 9/00; C08J 9/26; H01M 10/0525; H01M 50/409; H01M 50/411; H01M 50/431; Y02E 60/10

See application file for complete search history.

(56) References Cited

U.S. PATENT DOCUMENTS

2016/0126520 A1\* 5/2016 Mizuno ................. H01M 50/44
429/145
2018/0166670 A1 6/2018 Toyota et al.

FOREIGN PATENT DOCUMENTS

| JP | 2010-024463 | | 2/2010 |
| JP | 2010-540692 | A | 12/2010 |
| JP | 2012-38655 | A | 2/2012 |
| JP | 2014-217800 | A | 11/2014 |
| JP | 2015-136809 | A | 7/2015 |
| WO | 2006-106783 | A1 | 10/2006 |
| WO | 2008/035674 | A | 3/2008 |
| WO | 2008/093572 | A1 | 8/2008 |
| WO | 2016/080200 | A1 | 5/2016 |
| WO | 2016/132808 | A1 | 8/2016 |
| WO | 2016/194962 | A1 | 12/2016 |

\* cited by examiner

MICROPOROUS MEMBRANE LITHIUM ION SECONDARY BATTERY AND METHOD OF PRODUCING THE MICROPOROUS MEMBRANE

TECHNICAL FIELD

This disclosure relates to a microporous membrane, a lithium ion secondary battery and a method of producing the microporous membrane.

BACKGROUND

Thermoplastic resin microporous membranes are widely used as separation membranes, selectively permeable membranes, isolation membranes, and the like of materials. Specific application examples of the microporous membrane include separators for batteries used in lithium ion secondary batteries, nickel-hydrogen batteries, nickel-cadmium batteries, and polymer batteries, separators for electric double-layer capacitors, various filters such as reverse osmosis filtration membranes, ultrafiltration membranes and microfiltration membranes, breathable waterproof clothing, medical materials, supports for fuel cells and the like.

Especially as separators for lithium ion secondary batteries, polyethylene microporous membranes are broadly used. In addition to their characteristics including the safety of the batteries and excellent mechanical strength contributing greatly to the productivity, polyethylene microporous membranes also have ion permeability by an electrolyte passing through micro pores while maintaining the electrical insulation property, and also are provided with a pore-blocking function to regulate the excessive temperature rise by blocking the penetration of ions automatically at about 120 to 150° C. in an abnormal reaction outside or inside of the battery.

Lithium ion batteries have expanded their use fields to large-sized and large capacity applications such as power tools, automobiles, bicycle storage batteries, and large electrical storage equipment in addition to so-called small-sized consumer applications including conventional mobile phones and batteries for PCs. Electrodes providing a high capacity as a battery structure have been increasingly applied to meet these demands. The electrode materials used for these electrodes have a characteristic that expansion and shrinkage of the volume accompanied by the charge and discharge is larger than those of conventional electrodes, and the separators have been required to show small change in the performance even when the electrodes are in expansion and shrinkage.

Separators have been developed to meet these demands (JP2012-038655 A, JP2007-262203 A, WO2008-093572, Japanese National-Phase Publication 2010-540692 and WO2006-106783).

JP2012-038655 A discloses, as a means of improving the durability of a battery, a microporous membrane film made of polypropylene and polyphenylene ether, and the microporous film shows constant values of stress and film thickness recovery rate when a flat indenter having a diameter of 50 μm is pushed 3 μm deep into the film.

In JP2007-262203 A, as a method of improving the compression resistance, a polyolefin microporous membrane in which small protrusions of the size smaller than 25% of the membrane thickness are introduced on the membrane surface has been developed. The stress and membrane thickness recovery rate are maintained within a certain range after the microporous membrane cut out in a square of 50 mm was compressed at 55° C. for 5 seconds to the 80% thickness of the initial membrane thickness.

WO2008-093572 discloses a polyolefin microporous membrane, wherein the maximal pore size, the elastic modulus in the longitudinal direction, the ratio of the elastic modulus in the longitudinal direction to the elastic modulus in the width direction are defined, and a 9-μm microporous membrane has excellent compression resistance in Example 16. A polyolefin microporous membrane having "good strain absorptivity" and maintaining good ion permeability after the compression is shown.

Japanese National-Phase Publication 2010-540692 discloses a microporous membrane in which the injection of electrolyte is improved by regulating the polyethylene composition and, in Examples 1 to 3, polyolefin microporous membranes show a small membrane thickness variation after the compression and have an air resistance of 500 seconds/100 ml or less. Japanese National-Phase Publication 2010-540692 has a characteristic of a pore size distribution curve having at least two peaks.

WO2006-106783 discloses a microporous membrane having a membrane thickness variation of 15% or less after heating at 2.2 MPa and 90° C. for 5 minutes and an air resistance of 700 seconds/100 ml/20 μm or less after a heat compression, and such physical properties are achieved by re-stretching the membrane at least in the monoaxial direction after the removal of a membrane-forming solvent.

Along with the increase in the size and capacity of lithium ion batteries, electrodes suitable for higher capacity as a battery material have been increasingly applied. As a method of increasing the capacity, at least one of the following has been studied: 1) adopting a new electrode material and 2) increasing the electrode material density in the battery. The new electrode material used in the method of 1) has a characteristic that the expansion and shrinkage accompanied by the charge and discharge is larger than those in conventional electrodes, and a problem of the deterioration of the battery performance with repeated charges and discharges has been revealed. As a measure for that problem, the separator has been required to show a small change in the performance even when the electrodes are in expansion and shrinkage. Moreover, to develop the method 2), thinning of the separator has been developed. At the same time, as the size of batteries are increasing, it is also necessary to consider that the temperature inside the battery during the charge and discharge gets higher than before.

JP2012-038655 A studies the compression property of a micro region and proposes a separator with a compression resistance. However, since the compression property of the micro region is studied, stress is relaxed around the region during the compression, and it was difficult to accurately simulate the compressed state inside the battery which is subject to stress in a wider area. In JP2012-038655 A, polyphenylene ether (PPE) in polypropylene is dispersed and thus the compression resistance is improved by voids from PPE, but there still remained a problem in the strength. JP 2012-161936 A, Example 1, 2.5 N/30 μm discloses, as related art, an improved microporous membrane, but it still requires a further improvement in strength.

JP2007-262203 A considers a compression behavior of a relatively large area, but the results were from the evaluation of compression resistance for a short time and, hence did not reflect a condition which can occur in a practical battery.

In WO2008-093572, as a means of improving the compressibility, a membrane which is easily deformed is considered. Despite the compression process for a relatively short time, the membrane thickness changed by 4 μm or more, and even the smallest change in the air resistance showed a deterioration by 2.6 times compared to before the compression.

By studying raw material compositions, stretching methods after a solvent removal, a microporous membrane and a separator which are excellent in compression resistance have been developed to improve the compression characteristics of a separator. As a countermeasure to the expansion and shrinkage of an electrode, the following separators have been developed: a) a separator which withstands stress applied to the separator and which shows a small variation in the membrane thickness, and b) a separator in which the membrane thickness slightly decreases in response to the pressure from the electrode, but the variation in ion permeability is small.

Under the model of a), Japanese National-Phase Publication 2010-540692 achieves the improvement of the injection of electrolyte and compression resistance by adjusting the polyethylene composition and regulating the pore size distribution, but the improvement of the performance was still required.

Under the model of b), WO2006-106783 proposes a polyolefin microporous membrane having improved compression resistance by re-stretching after the extraction of a plasticizer. The microporous membrane caused a membrane thickness variation of more than 15% after a compression at 2.2 MPa and 90° C. for 5 minutes, but showed an improved compression resistance. However, the suppression quality of the deterioration of the air resistance needed to be improved, and the strength was also insufficient.

In recent years, as the variation in ion permeability is required to be small, the mainstream has been the development under the model of b) which shows a smaller degree of deterioration of air resistance than under the model of a). In addition, those studies have been mainly on separators which have a membrane thickness of about 20 μm and thus have room for reduction in the membrane thickness.

On the other hand, with the recent increase in capacity of batteries, thinner separators have been increasingly applied to increase the electrode density as much as possible, and the membranes have been thinned from the conventional thickness of about 20 μm to 15 μm or less. A large variation in the membrane thickness under the compression conditions may cause insulation failure or the possibility of a thinner separator after the compression by the electrode during the charge and discharge of the battery. Therefore, it is not possible to maximize the electrode density inside the battery at the time of the manufacturing of the battery. The prior model based on the premise that the membrane thickness decreases to some extent (the model of the above b)) cannot offer a sufficient solution, and the deterioration of ion permeability accompanying the charge and discharge has become a major subject for development.

WO2008-093572 discloses a separator having excellent compression resistance at 15 μm or less, but the separator disclosed in WO2008-093572 has small strength, and there is still room for improvement in the battery productivity. Moreover, the membrane thickness of the separator greatly decreases, resulting in voids in the battery after the charge and discharge. Thus, the necessity to maximize the electrode in the battery was not satisfied.

In addition to those necessities, the safety which has been required for separators so far is still important as before. It is required to safely stop and maintain the battery function when the battery is heated abnormally, but this is a more difficult task for a thin membrane separator in which the amount of resin between electrode plates is greatly reduced.

Among the physical properties possessed by the microporous membrane as a separator, the heat shrinkage rate, shutdown, and meltdown property, for example, greatly contribute to the safety of the battery. When the battery abnormally generates heat, a short circuit may occur at the end of the electrode due to heat shrinkage of the separator. Thus, management of the heat shrinkage rate of the separator is important. Furthermore, in the shutdown function that stops the battery function safely by closing pores of the separator in an abnormal heat generation of the battery and blocking the ion conductivity, the shutdown temperature (SDT) is required to be lowered, and then the meltdown temperature (MDT) at which the ion conductivity returns again is required to be increased after the shutdown. Thus, the battery function can be safely stopped when heat is generated abnormally. Therefore, it is important not only to lower the temperature of the SDT but also to widen the temperature difference between the SDT and the MDT for the assurance of the battery safety.

We provide:

(1) A microporous membrane, wherein the average membrane thickness is 15 μm or less, the air resistance is 400 seconds or less, and the air resistance variation (60° C.) after a pressurization treatment under the conditions of 60° C., 4 MPa, and 10 minutes is 148% or less: wherein Air resistance variation(60° C.)=air resistance after the pressurization treatment at 60° C./air resistance prior to the pressurization treatment×100.

(2) The microporous membrane according to (1), wherein said air resistance variation is 145% or less.

(3) The microporous membrane according to (1) or (2), wherein the air resistance variation (80° C.) after a pressurization treatment under the conditions of 80° C., 4 MPa, and 10 minutes is 200% or less: wherein Air resistance variation(80° C.)=air resistance after the pressurization treatment at 80° C./air resistance prior to the pressurization treatment×100.

(4) The microporous membrane according to (3), wherein said air resistance variation (80° C.) is 190% or less.

(5) A microporous membrane, wherein the average membrane thickness is 15 μm or less, the air resistance is 400 seconds or less, and the air resistance variation (80° C.) after a pressurization treatment under the conditions of 80° C., 4 MPa, and 10 minutes is 200% or less: wherein Air resistance variation(80° C.)=air resistance after the pressurization treatment at 80° C./air resistance prior to the pressurization treatment×100.

(6) The microporous membrane according to (5), wherein said air resistance variation is 190% or less.

(7) A microporous membrane, wherein the average membrane thickness is 15 μm or less, and the variation ratio (80° C./60° C.) of the air resistance variation (80° C.) after a pressurization treatment under the conditions of 80° C., 4 MPa, and 10 minutes to the air resistance variation (60° C.) after a pressurization treatment under the conditions of 60° C., 4 MPa, and 10 minutes is 130% or less: wherein Variation ratio(80° C./60° C.)=(air resistance variation(80° C.)/air resistance variation(60° C.))×100, wherein, Air resistance variation(80° C.)=air resistance after the pressurization treatment at 80° C./air resistance prior to the pressurization treatment×100, and Air resistance variation(60° C.)=air resistance after the pressurization treatment at 60° C./air resistance prior to the pressurization treatment×100.

(8) The microporous membrane according to (7), wherein said variation ratio (80° C./60° C.) is 122% or less.

(9) The microporous membrane according to any one of (1) to (8), wherein the pin puncture strength corresponding to the membrane thickness of 12 µm is 4000 mN or more, the heat shrinkage rate after an exposure at 105° C. for 8 hours is 5% or less, and the average tensile rupture elongation is 130% or less.

(10) The microporous membrane according to any one of (1) to (9), wherein the shutdown temperature is 140° C. or less, or the temperature difference between the shutdown temperature and the meltdown temperature obtained by a temperature-increasing air permeability method is 10° C. or more.

(11) The microporous membrane according to any one of (1) to (10), wherein the average pore size is 0.1 µm or less.

(12) The microporous membrane according to any one of (1) to (11), comprising more than 2% of an ultra high molecular weight polyethylene component having a weight average molecular weight of 1,000,000 or more, or 5% or more of a molecule component having a weight average molecular weight of more than 1,000,000.

(13) A microporous membrane comprising more than 2% of an ultra high molecular weight polyethylene component having a weight average molecular weight of 1,000,000 or more, or 5% or more of a molecule component having a weight average molecular weight of more than 1,000,000, wherein the average membrane thickness is 15 µm or less, the air resistance is 400 seconds or less, the pin puncture strength corresponding to the membrane thickness of 12 µm is 4000 mN or more, the heat shrinkage rate after an exposure at 105° C. for 8 hours is 5% or less, the average tensile rupture elongation is 130% or less, and the average pore size is 0.1 µm or less.

(14) The microporous membrane according to (13), wherein the shutdown temperature is 140° C. or less, or the temperature difference between the shutdown temperature and the meltdown temperature obtained by a temperature-increasing air permeability method is 10° C. or more.

(15) The microporous membrane according to any one of (1) to (14), wherein the formation of a hybrid structure of a ladder-like structure in a submicron region and a three-dimensional network structure in a micron region is observed on at least one surface of the microporous membrane.

(16) A lithium ion secondary battery, wherein the microporous membrane according to any one of (1) to (15) is used.

(17) A method of producing a polyolefin microporous membrane, comprising:
(a) an extrusion step of melt blending and extruding a resin composition containing a polyolefin resin and a pore-forming material,
(b) a sheet forming step of sheet forming the extrudate obtained in said step (a) into a sheet,
(c) a first stretching step of stretching the sheet-shaped product obtained in said step (b) at least twice in at least different axial directions,
(d) an extraction step of extracting the pore-forming material from the stretched sheet obtained in said step (c), and
(e) a second stretching step of stretching the sheet obtained in said step (d) at least once in at least one axial direction, wherein at least one of the following (i) and (ii) is satisfied:

(i) the step (c) is a first stretching step of stretching the sheet-shaped product at least once in a sheet transport direction (MD direction) and at least once in a sheet width direction (TD direction), and the MD stretching magnification and the TD stretching magnification in the step (c) satisfy the following Equations (1-1) and (1-2):

$$TD \text{ stretching magnification} \geq MD \text{ stretching magnification} - \alpha \quad \text{Equation (1-1)}$$

$$\alpha = 2.0 \quad \text{Equation (1-2)},$$

(ii) the stretching temperature (T1) of a first axial stretching performed firstly in the step (c) and the maximal stretching temperature (T2) of a second stretching performed after the first axial stretching satisfy the following Equations (2-1) and (2-2), $$T1 - T2 \geq \beta \quad \text{Equation (2-1)}$$

$$\beta = 0 \quad \text{Equation (2-2)}.$$

(18) The method of producing a microporous membrane according to (17), wherein said (i) and said (ii) are satisfied simultaneously.

Although our polyolefin microporous membrane is a thin membrane, the increase ratio of the air resistance is low under heating conditions at a high temperature that can occur in high capacity and high output batteries, and the performance deterioration as a battery is small, and thus suitable as a separator of a lithium ion secondary battery. In addition, the polyolefin microporous membrane is excellent in pin puncture strength, heat shrinkage rate and processability in spite of its thin membrane.

DETAILED DESCRIPTION

Figure 1:
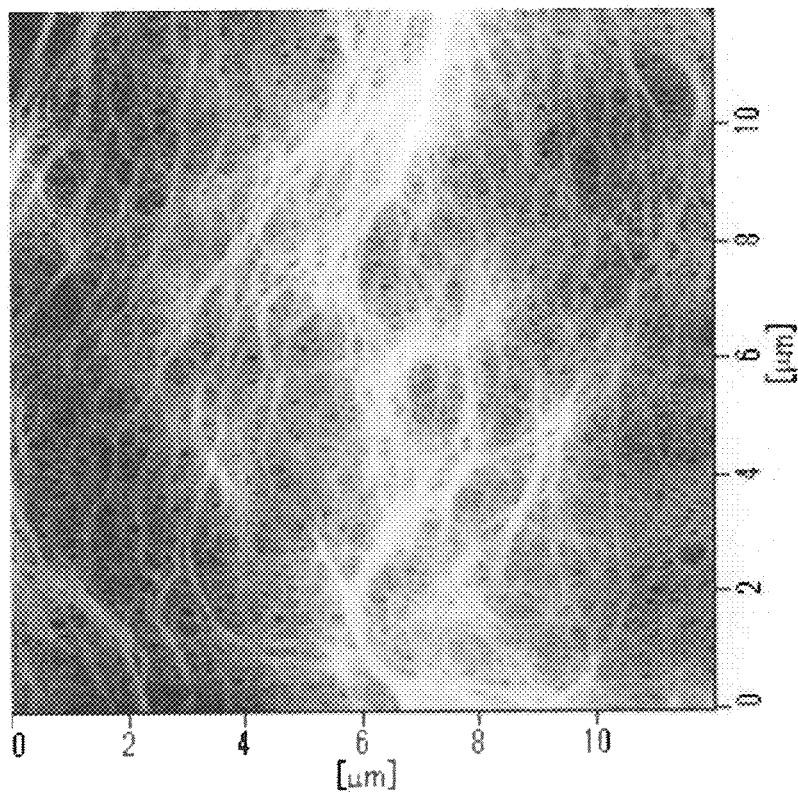
FIG. 1 is an AFM photo showing a surface image obtained from a microporous membrane.

To obtain a polyolefin microporous membrane is excellent in pin puncture strength, heat shrinkage and processability while having a membrane thickness of 15 µm or less, and also having a small performance deterioration even under heating conditions at a high temperature, we found that a polyolefin microporous membrane whose air resistance, which is an index of ion permeability, does not greatly deteriorate even by high temperature pressurization can be obtained by regulating the stretching conditions under certain conditions and forming uniform interaction of ultra high molecular weight components.

Raw Materials
Resin Types

Preferred examples of polyolefin resins forming the polyolefin microporous membrane are polyethylene and polypropylene. The polyolefin resin may be a single resin or a mixture of two or more different polyolefin resins, for example, a mixture of polyolefin resins selected from polyethylene, polypropylene, polybutene, and poly4-methyl-1-pentene. The polyolefin resin is not limited to a homopolymer of a single type and may be a copolymer of different olefins. Among such polyolefin resins, polyethylene is particularly preferred from the viewpoint of its excellent pore-blocking performance. The melting point (softening point) of polyethylene is preferably 70 to 150° C. from the viewpoint of the pore-blocking performance.

The polyolefin resin is explained below in detail, using polyethylene as an example. Examples of polyethylene include ultra high molecular weight polyethylene, high density polyethylene, medium density polyethylene, low density polyethylene and the like. The polyethylene polymerization catalyst is not particularly limited, and a Ziegler-Natta catalyst, a Phillips catalyst, a metallocene catalyst, or the like can be used. These polyethylenes are not limited to homopolymers of ethylene but also may be copolymers containing a small amount of another α-olefin. Suitable examples of α-olefins other than ethylene include propylene, 1-butene, 1-pentene, 1-hexene, 4-methyl-1-pentene, 1-octene, (meth)acrylic acid, esters of (meth)acrylic acid, styrene, and the like. The polyethylene may be a single substance, but preferably a polyethylene mixture containing two or more kinds of polyethylenes.

As the polyethylene mixture, a mixture of two kinds or more of ultra high molecular weight polyethylenes having different weight average molecular weights (Mw), of high density polyethylenes, of medium density polyethylenes, of low density polyethylenes, or a mixture of two kinds or more selected from ultra high molecular weight polyethylenes, high density polyethylenes, medium density polyethylenes and low density polyethylenes may be used. As the polyethylene mixture, a mixture of ultra high molecular weight polyethylene having a Mw of $5 \times 10^5$ or more and polyethylene having a Mw of $1 \times 10^4$ or more and $5 \times 10^5$ or less is preferred. The content of the ultra high molecular weight polyethylene in the polyethylene mixture is preferably from 1 to 70% by weight from the viewpoint of the tensile strength. The content of the ultra high molecular weight polyethylene in the polyethylene mixture is more preferably 2 to 65% by weight, and further preferably 5 to 60% by weight. When the ultra high molecular weight polyethylene is present in the polyethylene mixture in the proportion of 1% by weight or more, at least one of the membrane thickness variation and the air resistance variation during the compression can be suppressed, and the membrane strength is improved compared to the case of less than 1% by weight of the ultra high molecular weight polyethylene. When the content of the ultra high molecular weight polyethylene present in the polyethylene mixture is 70% by weight or less, the resin extrusion productivity improves.

The molecular weight distribution of polyethylene (the weight average molecular weight (Mw)/the number average molecular weight (Mn)) is preferably 5 to 200 from the viewpoint of the mechanical strength.

A polyethylene mixture containing 2% or more of an ultra high molecular weight polyethylene component having a weight average molecular weight of 1,000,000 or more or a polyethylene mixture containing 5% or more of a molecule component having a weight average molecular weight of 1,000,000 or more is desirably used. A polyethylene mixture containing 3% or more of an ultra high molecular weight polyethylene component having a weight average molecular weight of 1,000,000 or more or a polyethylene mixture containing 6% or more of a molecule component having a weight average molecular weight of 1,000,000 or more is more desirably used. The polyethylene component having a weight average molecular weight of 1,000,000 or more is preferably contained because the average pore size of the separator can be controlled to 0.1 μm or less, thereby preventing the deterioration of the separator performance under high temperature and high pressure conditions and the generation of metallic lithium dendrites accompanying the charge and discharge in the battery.

Solvent Type: Pore-Forming Material

The diluent is not particularly limited as long as it is a substance which can be mixed with the polyolefin resin or a substance which can dissolve the polyolefin resin. In the melt blending state with the polyolefin resin, a solvent which is miscible with polyolefin but exists in a solid state at room temperature may be mixed with the diluent. Examples of such solid diluents include stearyl alcohol, ceryl alcohol, paraffin wax and the like. Examples of liquid diluents include aliphatic, cycloaliphatic or aromatic hydrocarbons such as nonane, decane, decalin, paraxylene, undecane, dodecane, liquid paraffin and the like, mineral oil fractions which have a corresponding (same or equivalent) boiling point to that of these aliphatic, cycloaliphatic or aromatic hydrocarbons, and phthalate esters which are liquid at room temperature such as dibutyl phthalate and dioctyl phthalate, vegetal oils such as soybean oil, castor oil, sunflower oil, cotton oil, and other fatty acid esters. A nonvolatile diluent such as liquid paraffin is more preferably used to obtain a gel-like sheet having a stable content of the liquid diluent. For example, the viscosity of the liquid diluent is preferably 20 to 500 cSt at 40° C., more preferably 30 to 400 cSt, and further preferably 50 to 350 cSt. When the viscosity of the liquid diluent is 20 cSt or more, the extrudate from the die is uniform and the blending is also easy. When the viscosity of the liquid diluent is 500 cSt or less, the removal of the solvent (diluent) is easy.

For the mixing ratio of the polyolefin resin and the diluent, when the total of the polyolefin resin and the diluent is considered as 100% by mass, 1 to 60% by mass of the polyolefin resin is preferred from the viewpoint of good sheet formability of the extrudate. The proportion of the polyolefin resin to the mixture of the polyolefin resin and the diluent is more preferably 10 to 55% by weight, and further preferably 15 to 50% by weight. When the ratio of the polyolefin resin to the mixture of the polyolefin resin and the diluent is 1% by weight or more, the die swell and neck-in at the die exit during the extrusion can be prevented, resulting in improved membrane formability of a gel-like sheet. On the other hand, the ratio of the polyolefin resin to the mixture of the polyolefin resin and the diluent of 60% by weight or less can maintain a small differential pressure at the die portion, resulting in the stable production of a gel-like sheet. The uniform melt blending step of the polyolefin solution is not particularly limited and include, in addition to a calendar and various mixers, an extruder equipped with a screw and the like.

Production Method

A production method by the wet method includes, for example, a method in which a microporous membrane is obtained by heating and melt blending polyethylene (polyolefin resin) and a solvent for sheet forming, extruding and cooling the obtained resin solution from a die to form an unstretched gel-like sheet, stretching the obtained unstretched gel-like sheet at least in a monoaxial direction, removing the solvent for sheet forming and drying the resulting.

The polyethylene microporous membrane may be a single layer membrane or have a layer structure composed of two or more layers having different molecular weights or different average pore sizes. In a layer structure composed of two or more layers, the molecular weight and the molecular weight distribution of at least one outermost layer of the polyethylene resin preferably satisfy the above ranges.

A multi-layer polyethylene microporous membrane composed of two or more layers can be produced by any of the following examples: a method in which each polyethylene (polyolefin resin) constituting the layer A and the layer B is heated and melt blended with a solvent for sheet forming, and each of the obtained resin solutions is introduced from respective extruders into one die and combined by co-extrusion, a method in which gel-like sheets constituting each layer are overlaid on each other and thermally fused, a method in which the gel-like sheets are individually fused thermally after stretching, a method in which gel-like sheets are thermally fused after the solvent is removed. The co-extrusion method is preferred because adhesion strength between layers can be easily obtained, and easy formation of communication holes between the layers allows the permeability to be kept high, and the productivity is excellent.

Mixing, Blending

The preferred range of the temperature of the polyolefin solution in the extruder depends on the resin. For example, for the polyethylene composition, a temperature of 140 to 250° C. is preferred, and when polypropylene is contained, the preferred range is 190 to 270° C. The temperature of the polyolefin solution in the extruder is indirectly measured by installing a thermometer inside the extruder or at a cylinder portion, and the heater temperature, rotation speed and extrudate amount of the cylinder portion are appropriately adjusted so that the target temperature is achieved. The diluent may be added before the blending or added during the blending. In melt blending, an antioxidant is preferably added to prevent oxidation of the polyolefin resin.

Extrusion and Casting

The polyolefin solution melt blended in the extruder is cooled to form a diluent-containing resin composition. In this example, the extrusion from a die having a slit-like opening is preferred in order to prepare a sheet-like resin composition, but a so-called inflation method in which a resin composition is solidified by extrusion from a die for a blown film having a circular opening can be also applied. The extrusion temperature is preferably 140 to 250° C., more preferably 160 to 240° C., and further preferably 180 to 230° C. The extrusion temperature of 140° C. or more can prevent the excessive increase in pressure at the die portion, and the extrusion temperature of 250° C. or less can prevent the deterioration of materials. The extrusion rate (the sheet membrane-forming rate) is preferably 0.2 to 15 m/min. A gel-like sheet is formed by cooling the polyolefin resin solution extruded in a sheet form. Cooling methods include a method of bringing the polyolefin resin solution into contact with a coolant such as cold air, cooling water or the like, a method of bringing the polyolefin resin solution into contact with a cooling roll, or the like, and a method of bringing the polyolefin resin solution into contact with a roll cooled with a coolant is preferred. For example, an unstretched gel-like sheet can be formed by bringing the polyethylene resin solution extruded in a sheet form into contact with a rotary cooling roll having a surface temperature set at 20° C. to 40° C. with a coolant. The extruded polyethylene resin solution is preferably cooled to 25° C. or lower. In this case, the cooling rate is preferably 50° C./min or more. Cooling methods as above can lead to a microphase separation of the polyolefin phase from the solvent. This way, the unstretched gel-like sheet is likely to have a dense structure, and the excessive increase of crystallinity can be suppressed, and thus, the unstretched gel-like sheet obtains a structure suitable for stretching. As a method of cooling, to improve sheet cooling efficiency and sheet planarity, a method of cooling the polyolefin resin solution by placing two or more types of rolls close to each other and holding the resin solution extruded onto one roll with one or more rolls may be applied. Further, to form a gel-like sheet in the high-speed membrane production, a chamber for attaching the sheet with the roll may be used. The membrane thickness can be controlled by adjusting each extrusion amount of the polyolefin solution. As the extrusion method, for example, the methods disclosed in JPH06-104736 B and JP3347835 B can be used.

Stretching

A desired stretching method in the first stretching step is stretching in two or more stages with the diluent contained. The stretching method in each stage is not particularly limited. Preferred examples also include performing simultaneous biaxial stretching after monoaxial stretching, and performing monoaxial stretching after simultaneous biaxial stretching. Considering the productivity and the investment cost, an example of another monoaxial stretching after monoaxial stretching is also preferred. As for the stretching directions of the sheet transport direction (MD) and the sheet width direction (TD), for example, the TD stretching may be performed after the MD stretching, or the MD stretching may be performed after the TD stretching. After heating, a gel-like sheet can be stretched by a tenter method, a rolling method, a flatting method, or a combination thereof.

As an example, stepwise biaxial stretching in which roll-stretching is performed in the MD direction and then stretching by a tenter method is carried out in the TD direction is explained.

The stretching magnification before the extraction of the diluent varies depending on the thickness of the gel-like sheet, but the MD stretching (MDO) by 2 times to 12 times is preferred. The MD stretching magnification before the extraction of the solvent is more preferably 3 times to 12 times, further preferably 5 times or more and 11 times or less, and still further preferably 5.0 times or more and 11.0 times or less. The MD stretching by 2 times or more before the extraction of the solvent allows for a uniform stretching. Therefore, during the TD stretching following the MD stretching, a formation of an uneven structure in the MD direction can be avoided. The MD stretching by 5 times or more before the extraction of the solvent results in a uniform membrane thickness distribution in the MD direction and is preferred to control the membrane quality (wrinkles, sagging) which will be important in the post-processing. Further, the MD stretching can be performed in two or more stages. In the MD stretching, the region where the MD stretching is applied is formed by a preheating part, a stretching part, and a thermal fixation part, and the temperature of the gel-like sheet (or the film being stretched) is controlled by heating and cooling with rolls in the above region. In the stretching part, a peripheral speed difference between the rolls and a stretching section divided into a plurality of stages can be used to carry out the stretching. That is, in the stretching part, the peripheral speed of the downstream side (winding side) roll adjacent to the roll on the most upstream side (the die side) is increased, and the peripheral speed difference between these two rolls is used to stretch the gel-like sheet. In this manner, the MD stretching in two stages or more (multistage) is performed as rolls with a peripheral speed higher than that of the upstream rolls are arranged sequentially on the downstream stage side. Specifically, when two pairs of rolls having different peripheral speeds from each other (two pairs of rolls which are set such that the peripheral speed of the downstream side roll is faster than that of the upstream side roll) are arranged in the stretching part, the MD stretching is carried out in two stages, and when three pairs of the rolls are arranged in the stretching part, the MD stretching is carried out in three stages. Among these pairs of rolls, the roll on the downstream side in any pair and the roll on the upstream side in a pair of rolls which is adjacent to and on the downstream side of the above pair may be made common. For example, a two-stage stretching section may be formed by three rolls.

The stretching magnification in each pair of rolls can be either equal or different. The stretching magnification in each stage is more preferably different in a way that the stretching magnification increases on the more downstream side, thereby preventing further the increase in the air resistance during the heat compression. Although the reason is uncertain, at an equal magnification, stretching is carried out at a relatively high magnification at the initial stage of stretching. When the stretching magnification is increased at different magnifications, it is presumed that the micro structure formed by the MD stretching tends to be uniform and the compression resistance is improved.

The stretching in the TD direction after the MD stretching is preferably by 2 to 12 times, more preferably 3 times to 12 times, and further preferably 5 times to 10 times to improve the strength in the sheet width direction and the productivity. To form a uniform membrane structure in the TD direction (in order to form a uniform formation of holes), the stretching magnification in the TD direction is desirably 2 times or more. To obtain more uniform physical properties (air resistance, strength (pin puncture, tensile), heat shrinkage rate) in the TD direction, the stretching magnification in the TD direction of 5 times or more is more desired. The stretching magnification in the TD direction of 12 times or less can prevent the variation of physical properties due to a high stretching magnification. The stretching magnification in the TD direction is further preferably 10 times or less from the viewpoint of the production stability (to obtain uniform physical properties in the TD direction while stabilizing the productivity).

The total area magnification in the MD stretching and the TD stretching before the extraction of the solvent is preferably 25 times or more, more preferably 30 times or more, and the most preferably 40 times or more. The area magnification of the stretching before the extraction of the solvent is preferably 25 times or more to improve the strength. The average tensile elongation is determined by the square root of the product of the elongation in the MD direction and the elongation in the TD direction, and represented by the formula, ((the elongation in the MD direction)×(the elongation in the TD direction))$^{0.5}$. This average tensile elongation is preferably 130% or less. The stretching area magnification before the extraction of the solvent is preferably set at 40 times or more to obtain the average tensile elongation of 130% or less. On the other hand, the area magnification of the stretching before the extraction of the solvent is preferably 200 times or less, more preferably 180 times or less, and the most preferably 150 times or less. When the stretching before the extraction of the solvent is carried out at the area magnification of 200 times or less, the stability is obtained during the membrane formation and is preferred from the viewpoint of the production of the microporous membrane.

The TD stretching magnification and the MD stretching magnification before the extraction of the solvent preferably satisfy Equation (1-1).

$$TD \text{ stretching magnification} \geq MD \text{ stretching magnification} - \alpha \quad (1\text{-}1)$$

The α in Equation (1) represents the degree of orientation in the unstretched sheet as described later, and is a value derived empirically.

By satisfying such a relationship, a microporous membrane excellent in high temperature compression characteristics (high temperature compression resistance) can be obtained. The reason can be assumed as follows, although it is not clear. In our technique, since the structure is likely to be limited in the MD direction at the stage of the formation of the unstretched sheet, the stretching magnification in the subsequent MD stretching and the structure (orientation) of the unstretched sheet are combined to obtain a structure oriented in the MD direction. After the MD stretching, the structure in TD direction perpendicular to the MD direction is developed further by the TD stretching of a certain magnification or more. Thus, a more uniform membrane is easily obtained. The degree of orientation resulting from the orientation during the formation of an unstretched sheet is considered as α. In consideration of this, when the ratio of the MD stretching magnification to the TD magnification is adjusted to be higher in the TD direction than in the MD direction, it is believed that a membrane in which fibrils are developed uniformly in the surface direction can be obtained. In summary, when the TD stretching magnification and the MD stretching magnification satisfy Equation (1-1), the pore-forming of the fibrils is likely to occur in both in the MD direction and in the TD direction. When the TD stretching is performed after the MD stretching, a higher stretching magnification in the TD direction during the pore-forming of the fibrils can facilitate the interaction between the fibrils. The development of the interaction of the fibrils can form a structure whose physical properties at the time of the compression are not likely to change. Therefore, the TD stretching magnification and the MD stretching magnification need to be regulated. The α is preferably 2.0, more preferably 1.5, further preferably 1.0, still further preferably 0.5, and the most preferably 0.0.

The stretching temperature in both of the MD stretching (MDO) and the TD stretching (TDO) is preferably the melting point of the polyolefin resin or less, and more preferably in the range of (the crystal dispersion temperature Tcd of the polyolefin resin) to (the melting point of the polyolefin resin −5° C.), and further preferably (the crystal dispersion temperature Tcd of the polyolefin resin +5° C.) to (the melting point of the polyolefin resin −5° C.). For example, the stretching temperature in the polyethylene resin is about 90 to 130° C., and more preferably 100 to 127° C. The stretching temperature of the polyethylene resin is further preferably 105 to 125° C. When the stretching temperature of the polyethylene resin is higher than or equal to the crystal dispersion temperature of the polyolefin resin, the occurrence of micro cracks at the time of stretching can be suppressed, thereby preventing a bigger pore size (particularly the maximal pore size, BP) in the end. As a result, the permeation of ions becomes uniform, and Li dendrites are less likely to occur. Thus, a good battery performance is maintained. In addition, when the stretching temperature of the polyethylene resin is less than or equal to the melting point of the polyolefin resin, a uniform stretching occurs, which prevents wrinkles and sagging and thus assures the productivity of the separator.

Considering that stretching is performed in the MD direction by a rolling method after the stretching in the TD direction by a tenter method, a relationship of each stretching temperature in performing the stretching in at least two or more stages is described in detail.

In the film production, the stretching is generally performed in multi stages. Even the monoaxial stretching is performed in multi stages to regulate the temperature and the magnification, thereby producing a more uniform membrane. In the biaxial stretching in different directions, a method of performing the stretching in the MD direction and in the TD direction, for example, is used widely as a method of obtaining a membrane with little anisotropy. In so-called "wet-process stretching" in which a solvent is used as a plasticizer used for separator production, a simultaneous biaxial stretching process has been used especially when polyethylene is used as the resin. Such a simultaneous biaxial stretching process can provide uniform physical properties of the film such as the membrane thickness, the air resistance and the strength and has been suitable for production of a thin membrane of 10 μm or less. However, in the simultaneous biaxial stretching process, since the stretching with a solvent, in other words, "wet-process stretching" is performed in one stage (once), the stretching temperature has been regulated only for a small region. In other words, in the conventional wet-method simultaneous biaxial stretching process, a long heating oven was required to prevent the uneven temperatures in the heating oven and to expand the temperature regulation possible range during the stretching, which increased the initial introduction cost. Thus, the expansion of the stretching temperature was difficult, Therefore, in the conventional wet-method simultaneous biaxial stretching process, the membrane production was limited in a relatively narrow range of temperatures in the heating oven.

Furthermore, wet-process stretching in multi stages, in other words, a method of performing separately the stretching in one axial direction of two axes (two directions) of the MD direction and the TD direction and the stretching in the other axial direction was also considered. However, such a consideration was mainly about the technique which focused on the MD stretching conditions, and few technological developments have been made which focus on the influence of each temperature in the separate stretching processes in the two axial directions. As described in detail with respect to the stretching magnification, the stretching magnification in each of the MD direction and the TD direction is 12 times or less, and at such a stretching magnification, the orientation is mainly in the stretching direction at the completion stage of the first axial stretching. Therefore, in this method, it is considered that the uniformity as a membrane can reach a level usable as a separator by adjusting the total area stretching magnification to 25 times or more in the second axial or subsequent stretching. As the total area stretching magnification becomes higher, the pin puncture strength and the tensile strength are more improved, but the shutdown temperature which affects the safety of the battery tends to rise. The shutdown temperature herein refers to the temperature at which the pores of the separator are blocked to block the permeation of lithium ions and thus, the battery function is stopped. It is necessary to increase the strength of the separator compared to conventional ones for a suitable battery production in producing a thin membrane of 15 μm or less, particularly of 12 μm or less. One method of increasing the strength is to increase the total area stretching magnification. However, when the shutdown temperature increases and especially when the total area stretching magnification exceeds 45 times, it is more difficult to keep the balance between mechanical properties and the safety of the separator. As one method of decreasing the shutdown temperature, the technique of using a resin having a low-melting point has been developed, but the balance among the air resistance, the strength and the heat shrinkage rate were not sufficient.

For a separator of 15 μm or less, particularly of 12 μm or less having a good balance among the air resistance, the strength and the heat shrinkage rate, to improve the safety as well, the stretching temperature conditions were considered for when the stretching is performed separately and in order in one axial direction of two axes (two directions) of the MD direction and the TD direction (the first axial stretching) and then in the other axial direction (the second axial stretching). Generally, the shutdown temperature is affected greatly by the resin mobility and the pore distribution. Mainly, the meltdown temperature is affected greatly by the melting point and the viscosity of the resin, and when the resin composition is fixed under arbitrary conditions, the meltdown temperature stays constant even if other production conditions change. The increase in the shutdown temperature results in a smaller temperature difference between the meltdown temperature and the shutdown temperature. Even if the shutdown function shuts off the ion conduction in the case of an abnormal heat generation in the battery, when the temperature continues to rise due to the heat accumulation in the battery, the ion conduction is resumed by the meltdown of the separator. Thus, the risk of an ignition or the like increases. Therefore, it is necessary to lower the shutdown temperature as much as possible, or widen the difference between the shutdown temperature and the meltdown temperature.

It is important to lower the shutdown temperature for these reasons. The reason why the shutdown temperature rises with the increase of the total area stretching magnification is assumed that the increase in the total stretching magnification makes the mobility of the resin constituting the separator more restrictive. Accordingly, in the stretching process in which the first axial stretching and the second axial stretching are sequentially carried out (alternatively, the second axial stretching is further followed by another stretching at least once in an axial direction other than the first and second axes), an attempt was made to improve the mobility of the resin by increasing the stretching temperature of the second axial or subsequent stretching with respect to the that of the first axial stretching; however, contrary to the expectation, no improvement in the shutdown temperature could be obtained.

Therefore, we studied the influence of the stretching temperature, and found the following.

That is, we discovered that the shutdown temperature could be decreased when the relationship between the first axial stretching temperature (T1) and the maximal stretching temperature (T2) after the second axial stretching is maintained as in the Equation (2-1). By maintaining the relationship of the Equation (2-1), the shutdown temperature can be adjusted to 140° C. or less, or the temperature difference between the shutdown temperature (SDT) and the meltdown temperature (MDT) can be adjusted to 10° C. or more. Alternatively, when the relationship between the first axial stretching temperature (T1) and the maximal stretching temperature (T2) after the second axial stretching is maintained as in Equation (2-1), the temperature difference between the shutdown temperature and the meltdown temperature can be adjusted to 10° C. or more while the shutdown temperature is kept under 140° C. or less.

$$\beta \leq T1-T2 \qquad (2-1)$$

In Equation (2-1), we discovered that when β is preferably 0° C., more preferably 2° C., further preferably 5° C., and still further preferably 7° C., at least one of the shutdown temperature of 140° C. or less and the temperature difference of 10° C. or more between the meltdown temperature and the shutdown temperature could be achieved.

The reason why the shutdown temperature is improved under these conditions is not clear but can be assumed as follows. As described above, it is known that the shutdown temperature is influenced by the mobility of the resin and the pore size distribution and, therefore, it can be understood that the addition of a resin with a low melting point also increases the mobility of the resin and thus decreases the shutdown temperature. The reason for the improvement of the shutdown temperature by lowering the temperature after the second axial stretching in the multistage stretching process is assumed that, when the second axial or subsequent stretching is performed while the skeleton of the structure formed by the first axial stretching is maintained, a micro structure starting from the structure formed by the first axial stretching is formed, thereby lowering the shutdown temperature. We also assume that, when the second axial stretching is performed at a higher temperature than in the first axial stretching, the pore-formation and the formation of a new structure by the stretching progress simultaneously, resulting in a broader structure distribution and thus the formation of a non-uniform micropore structure.

At this time, by selecting the stretching conditions that satisfy Equation (2-1), not only the shutdown temperature and the meltdown temperature can be maintained as described above, but also a fine structure is formed. As a result, a separator which has a small variation in permeability after the compression and which is excellent in strength and heat shrinkage rate can be produced. To prevent the decrease in the air resistance after a treatment at a high temperature (80° C.), β is preferably 0° C., more preferably 2° C., further preferably 5° C., and still further preferably 7° C. In such a condition, the increase in the air resistance after the compression can be prevented.

The deformation rate in the TD stretching (TDO) can be determined from a membrane production rate and the clip position (site where the film is held) in the width direction (TD direction). By controlling the rail position in the heating oven in the TD direction, it is possible to control the width-widening rate in the TD direction, that is, the deformation rate. The deformation rate is desirably controlled at a constant rate in a region of preferably 80% or more, more preferably 85% or more, further preferably 90% or more of the entire stretching stages in the TD stretching. The desired deformation rate of the TD stretching is preferably 200%/second or less, more preferably 150%/second or less, and further preferably 130%/second or less. By setting the deformation rate of the TD stretching to 200%/second, it is possible to suppress the residual stress in the separator, and achieve a stable production with a low possibility of discontinuation of the production due to a membrane rupture or the like. The desired deformation rate of the TD stretching is preferably 10%/seconds or more, more preferably 15%/seconds or more, and further preferably 45%/seconds or more. By setting the deformation rate of the TD stretching to 10%/second, the investment for the equipment can be suppressed, and the production of economically useful separators is possible. The deviation in the deformation rate of the TD stretching (maximal deformation rate−minimal deformation rate) is preferably 70%/second or less, more preferably 50%/second or less, further preferably 20%/second or less, and the most preferably 5%/second or less. By controlling the deviation of the deformation rate of the TDO stretching below a certain value, the interaction of ultra high molecular weight components uniformly develops, and a microporous membrane which does not greatly deteriorate the air resistance when subjected to high temperature compression can be obtained.

Due to stretching as described above, cleavage occurs in the higher order structure formed in the gel-like sheet, resulting in a refined crystal phase and the formation of numerous fibrils. Fibrils form a three-dimensionally connected network structure. In addition to the improvement of the mechanical strength by stretching, the degree of interaction between fibrils can be controlled by regulating at least one of the stretching magnification and the stretching temperature. Therefore, even if a pressure is applied at a temperature of 100° C. or less, a structure whose performance hardly changes is obtained. Further, by performing the above stretching, since the shape is retained even at a high temperature, the insulation property can be easily maintained. Thus, the resulting microporous membrane is suitable for a separator of a battery, for example.

Washing and Drying

The stretched sheet thus obtained is subjected to a conventional technique, for example, a method described in WO2008-016174 to wash and remove the diluent, followed by drying, and thus a dried microporous plastic film is obtained. In obtaining a microporous plastic film, the stretched sheet may be reheated in the dry-process stretching step (second stretching step) after the washing step and re-stretched. The re-stretching step may be either by a roller type or a tenter type. It is also possible to adjust physical properties and remove residual strain by performing a heat treatment in the same step. By using the temperature condition according to Equation (3) as the dry-process stretching temperature D (T), the solid heat shrinkage rate is further improved. Specifically, the use of the condition of Equation (3) can decrease the heat shrinkage rate at 105° C., and a desired heat shrinkage rate is preferably 8% or less, more preferably 6% or less, and further preferably 5% or less in both the MD direction and the TD direction.

$$SDT-D(T) \leq \gamma \qquad (3)$$

"SDT" refers to "the shutdown temperature" and the measurement method thereof is explained later. When γ is preferably 12° C., more preferably 10° C., and further preferably 8° C., the solid heat shrinkage rate can be suppressed.

That is, various experiments are carried out in advance and data are obtained to figure out what kind of correlation exists between the shutdown temperature and the dry-process stretching temperature, and based on the acquired data, the dry-process stretching temperature is roughly set so that the shutdown temperature is, for example, around 140° C. While the membrane formation is continued, the shutdown temperature of the microporous membrane which has been already wound is measured, and the dry-process stretching temperature is adjusted to satisfy Equation (3) as described above. A microporous membrane with an excellent heat shrinkage rate can be thus obtained.

To produce a microporous membrane which shows a small deterioration of the air resistance after the compression, among Equations (1-1), (2-1) and (3) explained above, Equation (1-1) is preferably satisfied because the resulting microporous membrane has a small air resistance variation after a pressurization at 80° C. and under 4 MPa for 10 minutes, after a pressurization at 60° C. and under 4 MPa for 10 minutes, and after the increase of the heating temperature from 60° C. to 80° C. When Equation (2-1) is satisfied in addition to Equation (1-1), the deterioration of the air resistance after the compression is suppressed more than when only Equation (1-1) is satisfied, and it is also possible to decrease the shutdown temperature (or increase the temperature difference between the shutdown temperature and the meltdown temperature).

Moreover, Equation (2) is preferably satisfied simultaneously with the achievement of 2% or more of an ultra high molecular weight polyethylene or 5% or more of a polyethylene component having a molecular weight of 1,000,000 or more, because the microporous membrane thus obtained has at least one of the shutdown temperature of 140° C. or less or the difference of 10° C. or less between the shutdown temperature and the meltdown temperature.

To produce a microporous membrane with a high strength, the condition of containing 2% or more of the ultra high molecular weight polyethylene or 5% or more of a polyethylene component having a molecular weight of 1,000,000 or more and the condition of the total surface stretching magnification of 25 times or more before the extraction of the solvent are preferably satisfied at the same time because the resulting microporous membrane shows improved pin puncture strength and tensile strength, such as the pin puncture strength of 4000 mN (12 μm conversion). To control the tensile rupture elongation and improve the processability for when a battery is assembled using the microporous membrane or the surface of the microporous membrane is coated, the total surface stretching magnification before the solvent extraction of 40 times or more is preferred because it is possible to obtain a microporous membrane having an average tensile rupture elongation (the square root of the product of the tensile rupture elongation in the MD direction and the tensile rupture elongation in the TD directions) of 130% or less.

Equation (3) is preferably satisfied because it is possible to obtain a microporous membrane having a solid heat shrinkage rate (for example, heat shrinkage rate after a heat treatment at 105° C. for 8 hours) of 5% or less for each of MD and TD.

As a method of controlling the average pore size of the microporous membrane, when an ultra high molecular weight polyethylene is contained in an amount of 2% or more or a polyethylene component having a molecular weight of 1,000,000 or more is contained in an amount of 5% or more, a microporous membrane in which the maximal pore size is preferably 0.15 μm or less and the average pore size is 0.1 μm or less, and more preferably, the maximal pore size is 60 nm or less and the average pore size is 50 nm or less, can be obtained.

Preferably, the microporous membrane obtained herein has a characteristic in which a ladder-like structure is dominant in the submicron region and a hybrid structure having a three-dimensional network structure is dominant in the micron region. The "submicron region" refers to a structure size that can be confirmed under the observation with a 4 μm square field of view (4 μm×4 μm) by AFM (atomic force microscope) or the like. On the other hand, the "micron region" refers to a structure size that can be confirmed under the observation with a field of view of 12 μm square or more (12 μm×12 μm) by AFM or the like. The "ladder-like structure" defines a case where structures between adjacent fibrils (arrangement structure between adjacent fibrils) are arranged in a positional relationship which is close to orthogonal to each other. The "three-dimensional network structure" defines when fibrils take a three-dimensional network-like structure. "Dominant" indicates when a corresponding structure is observed in 50% or more of the area in the observation field. Therefore, under the observation of a fibril at an arbitrary position, when fibrils orthogonal to (intersecting) this fibril can be dominantly confirmed, they are referred to as the aforementioned "ladder-like structure". When fibrils branching from the fibril at the arbitrary position are dominantly confirmed, they are called "three-dimensional network structure". The "micron region" is formed by "submicron regions", but when the "micron region" is observed, we believe that the features of a larger and thicker structure become dominant and are observed as the structure difference as described above.

Figure 2:
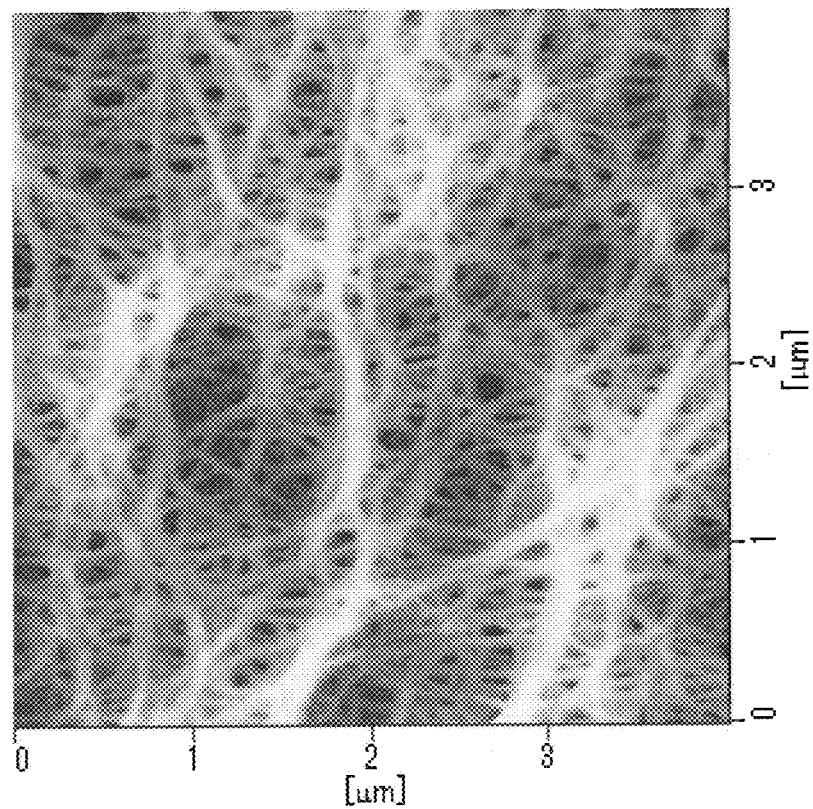
FIG. 2 is an AFM photo showing a surface image obtained from a microporous membrane.

FIGS. 1 and 2 show AFM photos obtained from the microporous membrane of the present invention showing such a structure. FIG. 1 shows a photo taken in the micron region as described above, and FIG. 2 shows a photo taken in the submicron region. Hereinafter, the longitudinal direction in the Figures is the MD direction and the transverse direction is the TD direction. As described in detail above, fine fibrils branch out from a middle portion of a specific fibril and extend to form a three-dimensional structure in the micron region while, in the submicron region, each fibril is arranged in a way that other fibrils intersect with the specific fibril to form a ladder-like structure. As a preferred microporous membrane, any one of the surfaces has the hybrid structure described above, and more preferably, the both sides have the above hybrid structure. The ratio of regions having characteristic structures may be different between both the surface layers.

Figure 3:
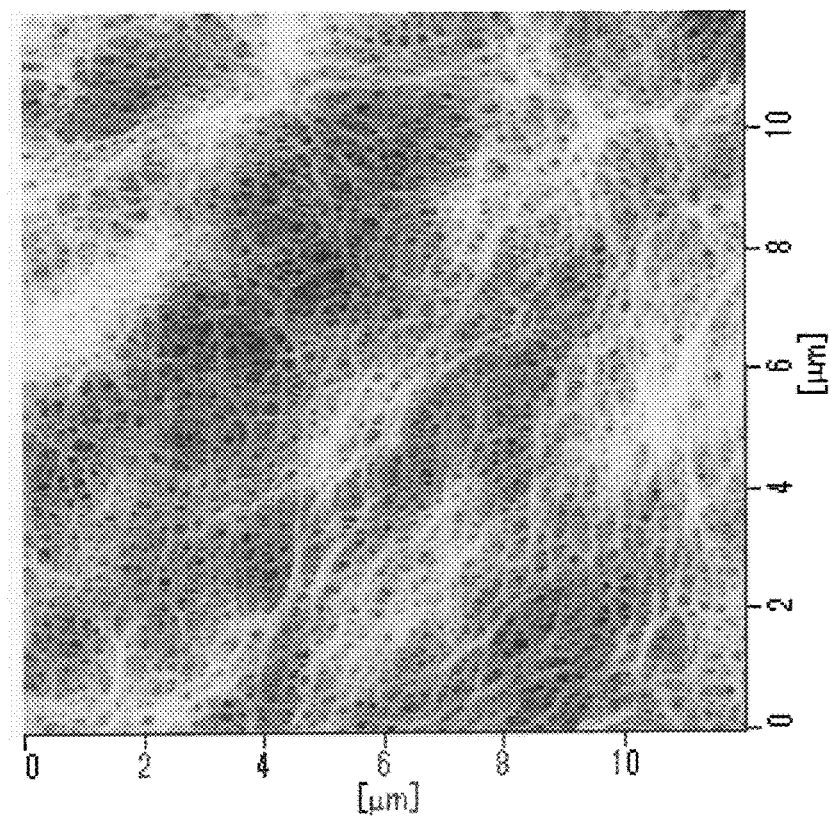
FIG. 3 is an AFM photo showing a surface image obtained from a microporous membrane produced by the conventional simultaneous biaxial stretching method.
Figure 4:
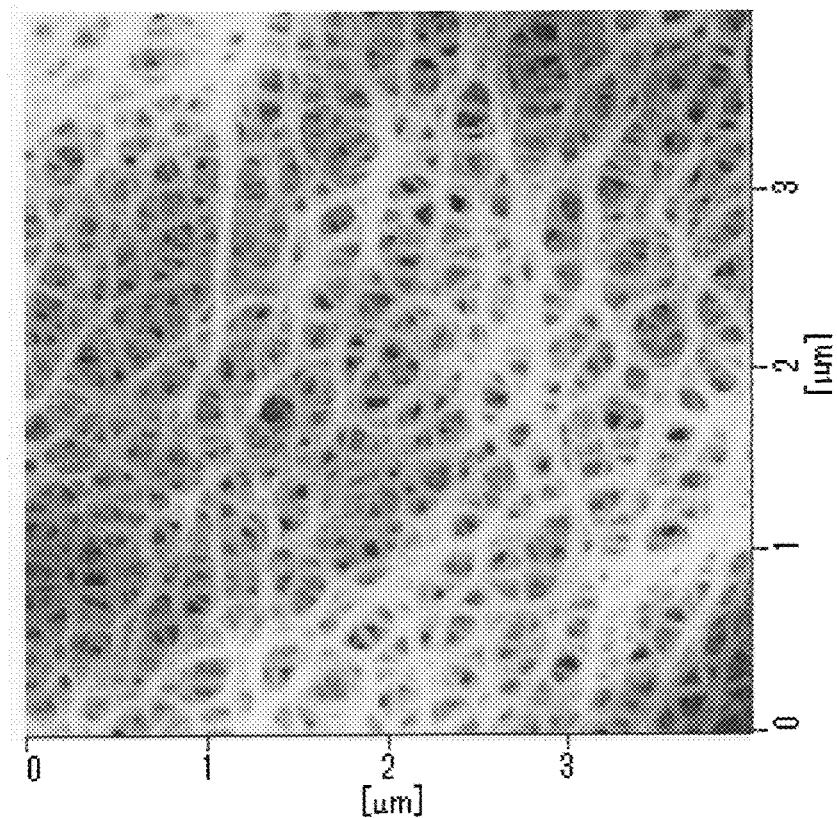
FIG. 4 is an AFM photo showing a surface image obtained from a microporous membrane produced by the conventional simultaneous biaxial stretching method.

The structure of the microporous membrane produced by a "simultaneous stretching" method in which an unstretched sheet is stretched in the MD direction and in the TD direction simultaneously is different from the microporous membrane because the "three-dimensional network structure" is formed in both of the submicron and micron regions. Specifically, the AFM photos of a microporous membrane produced by such a simultaneous stretching method are shown in FIG. 3 (the micron region) and FIG. 4 (the submicron region), and certain fibrils branch off in a net-like shape to form a three-dimensional structure in both Figures.

Figure 5:
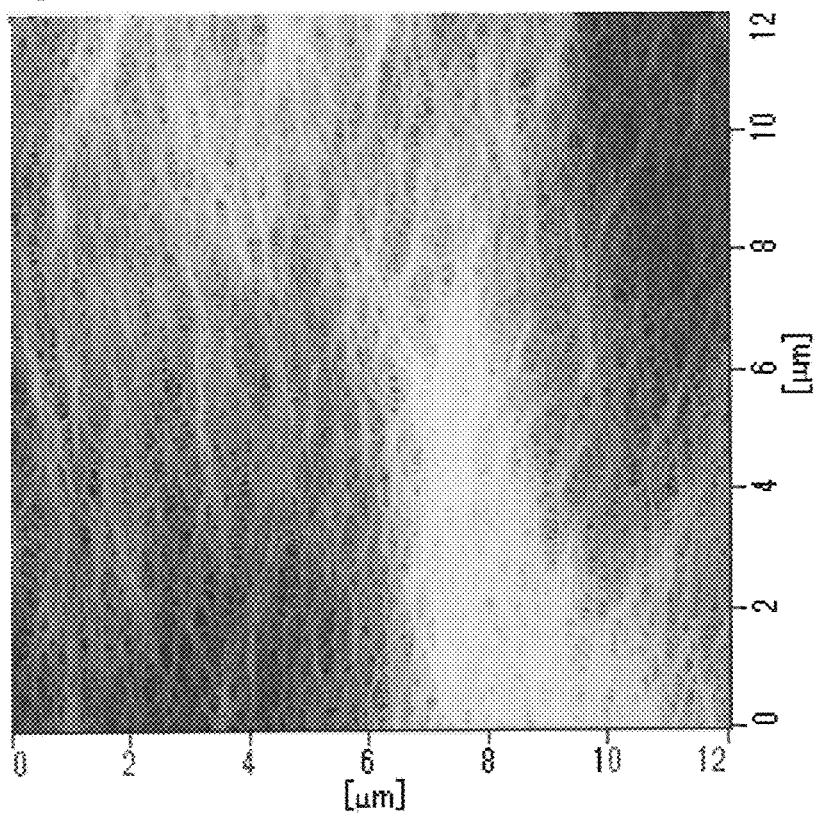
FIG. 5 is an AFM photo showing a surface image obtained from a microporous membrane produced by the conventional stepwise biaxial stretching method.
Figure 6:
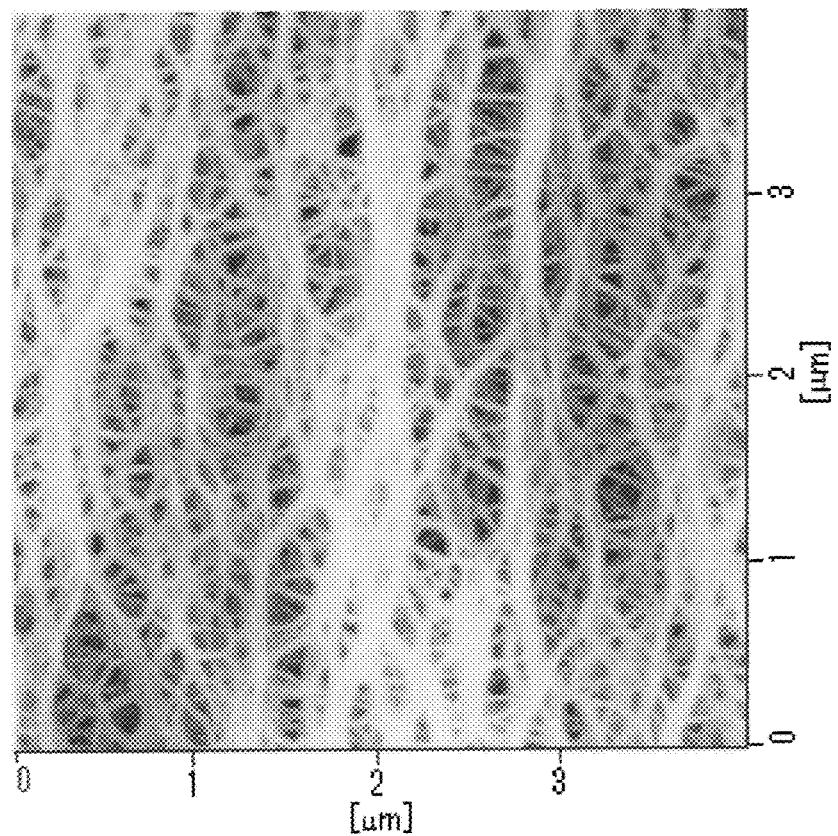
FIG. 6 is an AFM photo showing a surface image obtained from a microporous membrane produced by the conventional stepwise biaxial stretching method.

In a conventional stepwise biaxial stretching method in which an unstretched sheet is stretched gradually in the MD and TD directions, although the submicron region shows a ladder-like structure, the micron region shows a structure in which the fibrils are arranged selectively in the MD direction or in the TD direction (ladder-like structure). The AFM photos of a microporous membrane produced by a conventional stepwise biaxial stretching method are shown in FIG. 5 (micron region) and FIG. 6 (submicron region). The fibrils are arranged in a ladder form in both pictures (the fibrils are not arranged randomly, but oriented in one direction). Therefore, the microporous membrane has a structure different not only from that of microporous membranes produced by the simultaneous biaxial stretching method but also from that of microporous membranes obtained by the stepwise biaxial stretching process which has been known so far.

In summary, the microporous membrane forms a three-dimensional network structure formed by a large number of ladder-like structures. That is, the microporous membrane shows a ladder-like structure from a microscopic view, but as the ladder-like structures accumulate, each ladder-like structure is arranged so that a three-dimensional network structure is formed. On the other hand, the microporous membranes produced by the conventional stepwise biaxial stretching method has a ladder-like structure as a result of the accumulation of ladder-like structures while the microporous membranes produced by the conventional simultaneous biaxial stretching method has a three-dimensional network structure as a result of the accumulation of three-dimensional network structures. Therefore, an microporous membrane can possess a highly uniform and fine structure inherent in the microporous membranes produced by the simultaneous stretching method and a structure capable of achieving high permeability and strength, which is inherent in the microporous membranes produced by the stepwise biaxial stretching method. With such a structure, while high permeability, high strength and low heat shrinkage are exhibited, the safety function (low-temperature SDT and high-temperature MDT) can be achieved without deteriorating the ion conductivity even under high temperature and compression conditions in the battery. Therefore, as can be seen from Examples, compared with the comparative examples, remarkable characteristics in terms of physical properties can be obtained.

Further, depending on the application of the microporous membrane thus obtained, a surface treatment such as corona discharge or a functional coating such as heat resistant particles may be applied to the surface of the microporous plastic film.

The polyolefin microporous membrane according to a preferred example has the following physical properties.

(1) Membrane Thickness ($\mu m$)

The membrane thickness of the polyolefin microporous membrane is preferably 3 to 15 $\mu m$, more preferably 3 to 12 $\mu m$, and further preferably 5 to 12 $\mu m$ as the density and capacity of batteries have been increasing in recent years. The membrane thickness of 3 $\mu m$ or more can result in a separator which assures the insulation property.

(2) Bubble Point (BP), Pore Size and Average Pore Size (average Flow Hole Pore Size) (nm)

The polyolefin microporous membrane has a maximal pore size of preferably 0.15 $\mu m$ or less, more preferably of 0.12 $\mu m$ or less, further preferably of 0.1 $\mu m$ or less, and still further preferably of 0.06 $\mu m$ or less. The maximal pore size is determined from bubble points (BP) obtained by a palm porometer. The average pore size determined with a palm porometer is preferably 0.1 $\mu m$ or less, more preferably of 0.08 $\mu m$ or less, further preferably of 0.06 $\mu m$ or less, still further preferably of 0.05 $\mu m$ or less, and still further preferably of 0.039 $\mu m$ or less. A smaller pore size of the whole membrane makes the pores more resistant to crashes and reduces the variation in the membrane thickness and the air resistance.

(3) Air Resistance (sec/100 $cm^3$)

The air resistance (Gurley value) is preferably 400 sec/100 $cm^3$ or less. With the air resistance of 400 sec/100 $cm^3$ or less, when the microporous membrane is used in a battery, good ion conductivity is obtained. The air resistance can be adjusted by the stretching temperature and magnification before the extraction of the solvent, the dry-process stretching temperature and magnification after washing, and the resin composition.

(4) Porosity (%)

The porosity is preferably 25 to 80%. When the porosity is 25% or more, good air resistance can be obtained. When the porosity is 80% or less, the strength in the battery in which the microporous membrane is used as a separator is sufficient, and the short circuit can be prevented. The porosity is more preferably 25 to 60%, and further preferably 25 to 50%. The porosity in such a range is preferred because the pores of the separator are unlikely to be crashed during the compression.

(5) The 12 $\mu m$-Corresponding Pin Puncture Strength (mN)

The pin puncture strength corresponding to 12 $\mu m$ is 4000 mN (408 gf) or more, preferably 4500 mN, and more preferably 4900 mN or more. With the pin puncture strength corresponding to 12 $\mu m$ is 4000 mN or more, when the microporous membrane is incorporated in a battery as a separator for batteries, especially in the case of a thin membrane of 15 $\mu m$ or less, the short circuit between electrodes can be prevented.

(6) Tensile Rupture Strength (MPa)

The tensile rupture strength is preferably 80 MPa or more either in the MD direction and in the TD direction. The tensile rupture strength in this range can reduce the risk of the rupture of the membrane. The tensile rupture strength in the MD direction is preferably 110 MPa or more, more preferably 140 MPa or more, and further preferably 210 MPa or more. The tensile rupture strength in the TD direction is preferably 120 MPa or more, more preferably 170 MPa or more, and further preferably 180 MPa or more. When the tensile rupture strength is in the above preferred range, the membrane is more resistant to rupture even when pressed thermally under a high pressure in the production step of the battery, and thus the pores are unlikely to be crashed.

(7) Tensile Rupture Elongation (%), Average Tensile Rupture Elongation (%)

The tensile rupture elongation is 40% or more either in the MD direction and in the TD direction. This reduces the possibility of the rupture of the membrane of the separator during the battery production and when external force acts on the battery. The average tensile rupture elongation determined by the equation explained later is preferably 130% or less, more preferably 120% or less, further preferably 110% or less, and in this range, the residual strain after the winding can be lowered, and excellent processability is obtained.

(8) Heat Shrinkage Rate After the Exposure to a Temperature of 105° C. for 8 Hours (Solid Heat Shrinkage Rate) (%)

The heat shrinkage rate after the exposure to a temperature of 105° C. for 8 hours is 5% or less in both of the MD direction and TD direction. When the heat shrinkage rate is 5% or less, even in the use of the microporous membrane as a separator for a large lithium battery, a short circuit between the electrodes can be prevented since the end portions of the separator retracts toward the center at the time of heat generation. Therefore, to prevent the short circuit between the electrodes even when the battery generates heat, the heat shrinkage rate is preferably 8% or less, more preferably 6% or less, and further preferably 5% or less in both of the MD direction and TD direction. The heat shrinkage rate is still further preferably less than 5%. The heat shrinkage rate is preferably 4% or less in both of the MD direction and TD direction, and especially in the MD direction.

(9) Shutdown Temperature and Meltdown Temperature (° C.)

The shutdown temperature is preferably 145° C. or less, more preferably 143° C. or less, and further preferably 140° C. or less. With the shutdown temperature in this range, pores close at a lower temperature, thereby blocking the mobility of lithium ions, and thus the battery function can be safely stopped.

The meltdown temperature is preferably 145° C. or more, more preferably 147° C. or more, and further preferably 149° C. or more. A larger difference between the meltdown temperature and the shutdown temperature is preferred. With a larger difference between the meltdown temperature and the shutdown temperature, when the flow of lithium ions stops during the abnormal heat generation in the battery, the battery function can stop without resuming the lithium ion conduction even in the case of overheating (overshoot) of the temperature in the battery. The difference between the meltdown temperature and the shutdown temperature is preferably 8° C. or more, more preferably 10° C. or more, and further preferably 11° C. or more.

Physical properties associated with the heat compression test are described below. The upper limit of the internal pressure of the battery that can occur when high capacity electrodes are applied was set at 4.0 MPa. The heating temperatures were 60° C. and 80° C. Between these, 60° C. is assumed to be the temperature range inside the battery when the battery is used at a low rate (the use at less than 1 C, wherein 1 C is the discharge rate for the exhaustion within 1 hour), and 80° C. is assumed to be the maximal temperature that can occur inside the battery when a rapid charge and discharge state of 1 C or more is performed.

(10) Thickness Variation After the Heat Compression (%)

As an example, a pressurization test was performed assuming the conditions of 80° C. and 4.0 MPa as the upper limit of temperature and pressure that can occur (reach) at a high output in a large battery of 5 Ah or more. The membrane thickness variation after the heat compression under a pressure of 4.0 MPa at 80° C. for 10 minutes (see the equation below) is, when the membrane thickness before the compression is considered as 100%, preferably 85% or more, more preferably 87% or more, and further preferably 89% or more. With the membrane thickness variation of 85% or more, when the microporous membrane is used as a battery separator, the volume of the separator after the charge and discharge shows a small variation. Therefore, the number of electrodes to be used can be increased at during the battery assembly, leading to the maximization of the battery capacity.

The membrane thickness variation after the heat compression under a pressure of 4.0 MPa at 60° C. for 10 minutes (the same equation as above) is, when the membrane thickness before the compression is considered as 100%, preferably 90% or more, more preferably 91% or more, and further preferably 96% or more.

(11) Air Resistance Variation After the Heat Compression (%)

The air resistance variation (60° C.) after the heat compression under a pressure of 4.0 MPa at 60° C. for 10 minutes (the variation of Gurley values (sec/100 cm$^3$) before and after the heat compression, see the equation below) is preferably 148% or less, more preferably 145% or less, and further preferably 140% or less. When the air resistance variation after the heat compression under a pressure of 4.0 MPa at 60° C. for 10 minutes is in this range, a battery which suppresses the deterioration of the ion permeability in the temperature range inside the battery (about 60° C.) which is assumed when the battery is used at a low rate (the use at less than 1 C, wherein 1 C is the discharge rate for the exhaustion within 1 hour) can be formed. Depending on the battery system to be used, when the air resistance variation after the heat compression at 60° C. for 10 minutes is 148% or less (600 sec/100 cm$^3$ or less in the air resistance), the deterioration of the cycle property, which is the battery life, is suppressed.

On the other hand, the air resistance variation (80° C.) after the heat compression under a pressure of 4.0 MPa at 80° C. for 10 minutes (the variation of Gurley values (sec/100 cm$^3$) before and after the heat compression) is preferably 200% or less, more preferably 190% or less, and further preferably 180% or less. When the air resistance variation after the heat compression at 80° C. for 10 minutes is 200% or less, especially in use as a separator for a large battery, the deterioration of the battery performance can be suppressed in the temperature range which can occur partially for a short time inside the battery during the rapid charge and discharge.

The variation ratio of the air resistance variation (80° C.) to the air resistance variation (60° C.) (80° C./60° C.), which is defined by the following equation, is preferably 140% or less, more preferably 135% or less, and further preferably 130% or less. This ratio is further preferably. 122% or less.

The variation ratio (80° C./60° C.)=(the air resistance variation (80° C.)/the air resistance variation (60° C.))×100

The smaller this ratio is, the less deterioration of the separator performance occurs when the rapid charge and discharge is sporadically performed during normal use. That is, if the ratio is 140% or less, the deterioration of the cycle property can be suppressed even after the rapid charge and discharge and, thus, the irreversible deterioration of the impedance of the separator, which is a measure of flowability of lithium ions, can be prevented.

The membrane thickness variation (%) after the heat compression and the air resistance variation (%) after the heat compression are easily affected by the crystal orientation, the structure of pores of the membrane, the heat shrinkage rate and the like. In particular, a microporous membrane with a small variation in the air resistance can be obtained when the interaction formed by the polyethylene molecular weight component having a molecular weight of 1,000,000 or more occurs uniformly in the microporous membrane. As a means of achieving this, in addition to the control of the stretching magnification and the stretching temperature at the stretching stage under certain conditions, the deformation rate during stretching can be maintained within a constant rate fluctuation range to control uniformly the interaction structure formed by the ultra high molecular weight polyethylene component.

EXAMPLES

Test Methods

Our membranes, batteries and methods will be explained in more detail by way of the following Examples, but this disclosure is not limited to these Examples. The physical properties of the polyolefin microporous membrane were measured by the following methods.

(1) Membrane Thickness (μm)

The membrane thickness of 5 points within the range of 95 mm×95 mm of the microporous membrane was measured with a contact thickness meter (Litematic manufactured by Mitutoyo Corporation), and the average value of the membrane thickness was obtained.

(2) Average Pore Size (Average Flow Rate Pore Size) and Maximal (bubble Point (BP)) Pore Size (nm)

The average pore size (average flow pore size) and maximal (bubble point (BP)) pore size (nm) of the polyolefin microporous membrane were measured as follows.

A palm porometer manufactured by Porous Materials Inc. (trade name, model: CFP-1500A) was used to carry out the measurement in the order of Dry-up and Wet-up. For Wet-up, a pressure was applied to the polyolefin microporous membrane sufficiently soaked with Galwick (trade name) with a known surface tension, and the pore size converted from the pressure at which air started penetrating was used as the maximal pore size. For the average flow rate size, the pore size was converted from the pressure at the point where the pressure and flow rate curve showing the slope of ½ from the Dry-up measurement and the curve from the Wet-up measurement intersect. The following equation was used to convert the pressure to the pore size.

$$d=C\gamma/P$$

wherein d (μm) is the pore size of the microporous membrane, γ (dynes/cm) is a surface tension of the liquid, P (Pa) is the pressure, and C is the pressure constant (2860).

(3) Air Resistance (Sec/100 cm$^3$)

The air resistance (Gurley value) was measured in accordance with JIS P8117.

(4) Porosity (%)

The porosity was calculated from the following equation, using the mass w1 of the microporous membrane and the mass w2 of a pore-free membrane of the same size made of the same polyethylene composition as the microporous membrane.

$$\text{Porosity (\%)}=(w2-w1)/w2\times100.$$

(5) Pin puncture strength (mN) and 12 μm-corresponding pin puncture strength (mN/12 μm)

The maximal load value (P1) when a polyolefin microporous membrane was punctured with a needle having a diameter of 1 mm (tip: 0.5 mmR) at a speed of 2 mm/sec was measured as the pin puncture strength. The 12 μm-corresponding pin puncture strength (P2) was converted to the corresponding value in the membrane thickness T1 (μm), using the following equation.

$$P2=(P1\times12)/T1.$$

(6) Tensile Rupture Strength (MPa)

The tensile rupture strength was measured according to ASTM D882 using a strip test piece having a width of 10 mm.

(7) Tensile Rupture Elongation (%) and Average Tensile Rupture Elongation (%)

The tensile rupture elongation was determined by taking 3 strips with a width of 10 mm from the central portion of the polyolefin microporous membrane in the width direction and calculating the average value of the measurement results by ASTM D882 for each. The average tensile rupture elongation ($L_A$; %) obtained from the tensile rupture elongation in the MD ($L_M$) and TD ($L_T$) directions was determined by the following equation.

$$L_A=(L_M\times L_T)^{0.5}.$$

(8) Heat Shrinkage Rate After the Exposure to a Temperature of 105° C. for 8 Hours (%)

For the heat shrinkage rate, the shrinkage rate in the MD direction and the TD direction after the exposure of the microporous membrane at 105° C. for 8 hours was individually measured three times, and the average value was calculated.

(9) Shutdown Temperature (SDT) and Meltdown Temperature (MDT) (° C.)

The shutdown temperature and the meltdown temperature were measured by the method disclosed in WO2007/052663. According to this method, the microporous membrane is exposed to an atmosphere at 30° C., and the temperature is raised at 5° C./min, during which the air resistance of the membrane is measured. The temperature at which the air resistance (Gurley value) of the microporous membrane first exceeds 100,000 seconds/100 cm$^3$ was defined as the shutdown temperature of the microporous membrane. The meltdown temperature was defined as the temperature at which the air resistance which was measured while the temperature continued to rise after reaching the shutdown temperature reached again 100,000 seconds/100 cm$^3$. The air resistance of the microporous membrane was measured in accordance with JIS P8117 using an air resistance meter (EGO-1T, manufactured by Asahi Seiko Co., Ltd.).

(10) Membrane Thickness Variation After the Heat Compression (%)

The membrane thickness was measured with a contact thickness meter (manufactured by Mitutoyo Corporation). A polyolefin microporous membrane is sandwiched between a pair of press plates having a highly smooth surface and subjected to heat compression by a press machine under a pressure of 4.0 MPa at 80° C. (or 60° C.) for 10 minutes. A value obtained by dividing the membrane thickness after the compression by the membrane thickness before the compression is expressed in percentage as a membrane thickness variation (%) (see the equation below). Three points from the central portion of the polyolefin microporous membrane in the width direction were measured for the membrane thickness, and the average value of the measurement results were calculated.

Membrane thickness variation (%)=(membrane thickness after treatment)/(membrane thickness before treatment)×100

The "treatment" in the above equation means a treatment of pressurization and compression under the above-described conditions.

(11) Air Resistance Variation by the Heat Compression Treatment (%)

A polyolefin microporous membrane was subjected to heat compression under the same conditions as in the above (10), and the value obtained by dividing the air resistance after the heat compression by the air resistance before the heat compression was expressed in percentage as the air resistance variation (%) (see the equation below). Three points from the central portion of the polyolefin microporous membrane in the width direction were measured for the air resistance, and the average value was calculated.

Air resistance variation(80° C.)(%)=the air resistance after the pressurization treatment at 80° C./the air resistance prior to the pressurization treatment×100.

Air resistance variation(60° C.)=the air resistance after the pressurization treatment at 60° C./the air resistance prior to the pressurization treatment×100.

The variation ratio of the air resistance variation (80° C.) to the air resistance variation (60° C.) (80° C./60° C.) was determined from the following equation.

The variation ratio(80° C./60° C.)=(the air resistance variation(80° C.)/the air resistance variation (60° C.))×100

(12) Impedance (Ω·cm$^2$)

An impedance measuring device (SI 1250, SI 1287, manufactured by Solartron Metrology Ltd) was used to measure the impedance. Between electrodes in which a Ni foil (30 mm×20 mm) was provided on a glass plate (50 mm (W)×80 mm (L)×3 mm (T)), a microporous membrane (30 mm (W)×20 mm (L)) and about 0.02 ml of a typical electrolyte consisting of, using LiPF$_6$ of 1 mol/L, a lithium salt, ethylene carbonate (EC) and ethylmethyl carbonate (EMC) (EC:EMC=40:60 VOL %) were placed, and 1.0 kV was applied (constant voltage), and the value after 10 seconds was defined as electric resistance ($\Omega \cdot cm^2$). The measured value at room temperature was considered as 100%, and the impedance value after the heat compression treatment was obtained as a relative value.

(13) Shutdown Behavior and Meltdown Behavior Under Rapid Heating

Using the device described in (12) above, the above cell is placed in an oven. The temperature inside the oven was increased from a room temperature (25° C.) to 200° C. in 30 minutes, and the impedance was continuously measured. As the cell temperature was measured, the temperature at which the impedance first reached $1.0 \times 10^4$ ($\Omega \cdot cm^2$) was considered as the shutdown temperature, and while the temperature increase was continued, the duration during which $1.0 \times 10^4$ ($\Omega \cdot cm^2$) was maintained was measured. The evaluation was as follows: 1) remarkably excellent for 60 seconds or more (⊚), 2) excellent for 45 seconds or more (○), 3) standard for 30 seconds or more (Δ). On the other hand, it was evaluated as 4) inappropriate (×) for less than 30 seconds, and as 5) not able to contribute to the battery safety when the shutdown state was not reached. Such a test was carried out twice for each Example and each Comparative Example (limited to the samples judged to be testable) to obtain an average. In Tables 3 and 4 described later, these impedance evaluation results were expressed as "impedance retention test result".

(14) Polyethylene Molecular Weight and Molecular Weight Distribution Measurement The Mw and Mw/Mn of UHMWPE and HDPE each were measured by gel permeation chromatography (GPC) under the following conditions.

Measurement apparatus: GPC-150C available from Waters Corporation,
Column: Shodex UT 806 M available from Showa Denko K.K.,
Column temperature: 135° C.,
Solvent (mobile phase): o-dichlorobenzene,
Solvent flow rate: 1.0 ml/min,
Sample concentration: 0.1% by weight (dissolved at 135° C. for 1 hour),
Injection volume: 500 μl,
Detector: differential refractometer available from Waters Corporation, and
Calibration curve: it was prepared from a calibration curve of a standard polystyrene monodisperse sample using a predetermined conversion constant.

(15) Observation of the Surface of the Microporous Membrane

The surface of the microporous membrane in the submicron region or the micron region can be observed with a commercially available scanning probe microscope. As an example of such a scanning probe microscope, a measurement example using SPA-500 manufactured by Hitachi High-Technologies will be described below. Specifically, the surface of the microporous membrane can be observed in the DFM mode of such a device. A sample (microporous membrane) is fixed to the sample stage with a carbon tape, and the SI-DF 40 for DMF can be used as the cantilever. Then, the amplitude attenuation rate is set to −0.25 to −0.3, the scanning frequency is set to 0.5 to 1.0 Hz, and the I gain and the P gain are individually adjusted to observe the surface. A typical field size to be used can be 4 μm square and 12 μm square. The "ladder-like structure" refers to a structure where structures formed between adjacent fibrils (arrangement structure between adjacent fibrils) are arranged in a positional relationship which is close to orthogonal to each other. The "three-dimensional network structure" defines the case where the fibrils take a three-dimensionally network-like structure. "Dominant" indicates when a corresponding structure is observed in 50% or more of the area in the observation field. Therefore, under the observation of a fibril at an arbitrary position, when fibrils orthogonal to (intersecting) this fibril could be dominantly confirmed, they were referred to as the aforementioned "ladder-like structure". When fibrils branching from the fibril at the arbitrary position were dominantly confirmed, they were called "three-dimensional network structure".

Example 1

Production of the Polyolefin Microporous Membrane

To 100 parts by mass of a composition consisting of 30% by mass of ultra high molecular weight polyethylene having a mass average molecular weight of $2.7 \times 10^6$ and 70% by mass of high density polyethylene having a mass average molecular weight of $2.6 \times 10^5$, 0.375 parts by mass of tetrakis [methylene-3-(3,5-ditertiarybutyl-4-hydroxyphenyl)-propionate]methane was dry-blended to prepare a polyethylene composition. The obtained polyethylene composition was charged in an amount of 30 parts by weight into a twin-screw extruder. Further, 70 parts by weight of liquid paraffin was fed from the side feeder of the twin-screw extruder and subjected to melt blending. Thus, a polyethylene resin solution was prepared in the extruder. Subsequently, a polyethylene resin solution was extruded at 190° C. from a die installed at the tip of the extruder, and taken out by a cooling roll with the internal cooling water temperature kept at 25° C. to form an unstretched gel-like sheet.

The obtained unstretched gel-like sheet was passed through a group of four preheating rolls to raise the temperature of the sheet surface to 115° C. For a longitudinal stretching (MDO) roll, a metal roll with a width of 1000 mm, a diameter of 300 mm, and a hard chromium plating (the surface roughness: 0.5 S) was used. The surface temperature of each longitudinal stretching roll was 123° C., and the range of temperature fluctuation was +2° C. or less. By controlling the peripheral speed ratio of each roll such that the rotation speed of each stretching roll of the longitudinal stretching apparatus was faster downward, the gel-like sheet was stretched in the machine direction by 1.3/1.8/3.5 times in three divided stages with a total magnification of 8.2 times. Then, the sheet was passed through four cooling rolls and the sheet temperature was cooled to 50° C. Thus, a longitudinally stretched gel-like sheet was formed.

Both ends of the resulting longitudinally stretched gel-like sheet were gripped with clips, and the sheet temperature was raised at a preheating temperature of 114° C. in a tenter divided into 20 zones, and then the sheet was stretched in the transverse direction at 113° C. by 8.3 times and treated at a thermal fixation temperature of 85° C. Thus, a biaxially stretched gel-like sheet was formed. The interval between the clips in the direction of the traveling sheet was set to 5 mm from the entrance of the tenter to the exit. The wind speed fluctuation width of hot air in the width direction in the tenter was adjusted to be 3 m/sec or less. The average deformation rate in the transverse stretching (TDO) region was 52%/second, and the deviation between the maximal and minimal deformation rate was 2%/second. The obtained biaxially stretched gel-like sheet was cooled to 30° C., and then liquid paraffin was removed in a methylene chloride washing tank controlled at 25° C., and dried in a drying oven adjusted to 60° C.

The obtained dried sheet was heated to 132° C. in a re-stretching device, re-stretched to have a lateral magnification of 1.7 times with respect to the entrance width of the re-stretching device, and then subjected to a heat treatment such that the transverse magnification would be 1.6 times with respect to the entrance width of the re-stretching device. Then, the obtained sheet was subjected to a heat treatment for 20 seconds to obtain a polyolefin microporous membrane having a thickness of 12 μm.

The production conditions of the microporous membrane in Example 1 are shown in Tables 1 and 2, and the physical properties obtained from this microporous membrane are shown in Tables 3 and 4.

Examples 2 to 4

Microporous membranes were obtained in the same way as in Example 1 except that the composition of the resins, and the like were changed according to the conditions described in Tables 1 and 2.

Comparative Example 1

To 100 parts by mass of a composition consisting of 40% by mass of ultra high molecular weight polyethylene having a mass average molecular weight of $2.7 \times 10^6$ and 60% by mass of high density polyethylene having a mass average molecular weight of $2.6 \times 10^5$, 0.375 parts by mass of tetrakis[methylene-3-(3,5-ditertiarybutyl-4-hydroxyphenyl)-propionate]methane was dry-blended to prepare a polyethylene composition. The obtained polyethylene composition was charged in an amount of 28 parts by weight into a twin-screw extruder. Further, 72 parts by weight of liquid paraffin was fed from the side feeder of the twin-screw extruder and subjected to melt blending. Thus, a polyethylene resin solution was prepared in the extruder. Subsequently, a polyethylene resin solution was extruded at 190° C. from a die installed at the tip of the extruder, and taken out by a cooling roll with the internal cooling water temperature kept at 25° C. to form an unstretched gel-like sheet.

The obtained unstretched gel-like sheet was introduced into a simultaneous biaxial stretching machine and stretched by 5×5 times in the sheet transport direction (MD) and in the sheet width direction (TD). The temperature of the preheating/stretching/thermal fixation was adjusted to 117/117/100° C. The obtained biaxially stretched gel-like sheet was cooled to 30° C., and then liquid paraffin was removed in a methylene chloride washing tank controlled at 25° C., and dried in a drying oven adjusted to 60° C.

The obtained dried sheet was heated to 127° C. in a re-stretching device, re-stretched to have a lateral magnification of 1.4 times with respect to the entrance width of the re-stretching device, and then subjected to a heat treatment such that the transverse magnification would be 1.2 times with respect to the entrance width of the re-stretching device. Then, the obtained film was subjected to a heat treatment for 20 seconds to obtain a polyolefin microporous membrane having a thickness of 11 μm.

Comparative Example 2

A microporous membrane was obtained in the same way as in Comparative Example 1 except that the conditions were changed as described in Tables 1 and 2.

Comparative Examples 3, 4

Microporous membranes were obtained in the same way as in Example 1 except that the composition of the resins, and the like were changed according to the conditions described in Tables 1 and 2.

Comparative Example 5

A microporous membrane was obtained from the same polyethylene composition as in Example 1 under the conditions described in Tables 1 and 2, The heat shrinkage rate at 105° C. was high both in the MD direction and TD direction. The evaluation was canceled because of the inferior safety.

Comparative Example 6

The membrane production experiment was attempted by changing the longitudinal stretching temperature of Example 1 to 80/85° C. in preheating/stretching steps, respectively. In the longitudinal stretching step, a behavior of the sheet shifting in the width direction of the stretching roll over time (generally referred to as "meandering") was observed, and thus, a stable membrane production could not be performed.

Comparative Example 7

The membrane production experiment was attempted by changing the longitudinal stretching temperature of Example 2 to 130/135° C. in preheating/stretching steps, respectively. A phenomenon in which liquid paraffin which was a solvent flew out from the sheet was observed during the preheating stage, and meandering occurred before the stretching roll. A stable membrane production was difficult.

Comparative Example 8

A membrane was produced under the same conditions as in Example 1 except that TDO preheating/stretching temperatures were changed to 85/90° C., respectively. Since the stretching temperature was low, the stretching tension was increased, and a phenomenon that the film was detached from the holding clips during the TDO stretching. As a result, a microporous membrane could not be obtained.

Comparative Example 9

A membrane was produced under the same conditions as in Example 1 except that TDO preheating/stretching temperatures were changed to 125/133° C., respectively. The TDO stretching temperature was so high that the stretching behavior varied in the TD direction, resulting in an uneven film thickness, and a stable membrane production was impossible.

Comparative Example 10

A membrane was produced under the conditions in Tables 1 and 2. The resulting separator has an SDT or more than 140° C., and the difference from the meltdown temperature was less than 10° C. Therefore, the safety was considered inferior, and the evaluation was canceled.

Comparative Example 11

A membrane was produced under the conditions in Tables 1 and 2. After the longitudinal stretching roll, the sheet thickness varied over time in the MD direction after the MDO stretching. The resulting separator had uneven thickness in the MD direction, and wrinkles and sagging were observed. The resulting separator was unsuitable for use as a separator.

Comparative Example 12

A membrane was produced under the same conditions as in Example 1 except that the TDO magnification was changed to 4.9 times. Since the distribution of the thickness in the TD direction was unlikely to be even, and the air resistance, the strength and the heat shrinkage rate varied in the TD direction, the evaluation as a separator was difficult.

Comparative Example 13

A membrane was stretched under the same conditions as in Example 1 except that the TDO stretching magnification was changed to 11 times. Due to the high stretching magnification, the membrane was ruptured during the TDO stretching process, and it was impossible to obtain stably a separator.

Comparative Example 14

A membrane was produced under the conditions in Tables 1 and 2. The separator obtained by increasing the MDO stretching magnification was excellent in the strength and the heat shrinkage rate, but the compression resistance turned out to be inferior.

Based on Tables 3 and 4 in which the above results are described, Examples 1 to 4 show that the obtained separator showed excellent permeability and a small membrane thickness variation even after the exposure to a high temperature and a high pressure, and were excellent in strength and heat shrinkage rate required as a separator. Furthermore, by controlling SDT and MDT, which are a measure of safety, a high insulation state after the shutdown (impedance maintained at $1 \times 10^4$ ($\Omega \cdot cm^2$)) could be achieved over a long period of time.

TABLE 1

| | | | | Example 1 | Example 2 | Example 3 | Example 4 | Comparative Example 1 |
|---|---|---|---|---|---|---|---|---|
| Resin composition | | Ultra high polyethylene | Content proportion (%) (Mw (×10³), f (≥1M)) | 30<br>2700, 46% | 20<br>2700, 46% | 20<br>2700, 46% | 30<br>2700, 46% | 40<br>2700, 46% |
| | | High density polyethylene | Content proportion (%) (Mw (×10³), f (≥1M)) | 70<br>260, 5.0% | 80<br>260, 5.0% | 80<br>260, 5.0% | 70<br>260, 5.0% | 60<br>260, 5.0% |
| | | Solid content concentration (%) | | 30 | 30 | 30 | 30 | 28 |
| Stretching conditions | Stepwise biaxial stretching | MDO | Preheating temperature (° C.) | 115 | 118 | 113 | 111 | — |
| | | | Stretching temperature (° C.) | 123 | 121 | 122 | 121 | — |
| | | | Thermal fixation temperature (° C.) | 50 | 50 | 50 | 50 | — |
| | | | Magnification (times) | 8.2<br>(1.3 ×<br>1.8 × 3.5) | 6.5<br>(1.87 ×<br>1.87 × 1.87) | 6<br>(1.3 ×<br>1.8 × 2.5) | 7<br>(1.3 ×<br>1.8 × 2.99) | — |
| | | TDO | Preheating temperature (° C.) | 114 | 114 | 120 | 114 | — |
| | | | Stretching temperature (° C.) | 113 | 114 | 120 | 113 | — |
| | | | Thermal fixation temperature (° C.) | 85 | 85 | 85 | 105 | — |
| | | | Magnification (times) | 8.3 | 7.7 | 6.8 | 8.5 | — |
| | | | Maximal deformation rate deviation (%/second) | 2 | 1 | 1 | 3 | — |
| | Simultaneous biaxial stretching | | Preheating temperature (° C.) | — | — | — | — | 117 |
| | | | Stretching temperature (° C.) | — | — | — | — | 117 |
| | | | Thermal fixation temperature (° C.) | — | — | — | — | 100 |
| | | | Magnification (times) | — | — | — | — | 5 × 5 |
| | Heat treatment | | Temperature (° C.) | 132 | 132 | 132 | 131 | 127 |
| | | | Magnification (times) | 1.7→1.6 | 1.55→1.5 | 1.5→1.4 | 1.16→1.10 | 1.4→1.2 |

| | | | | Comparative Example 2 | Comparative Example 3 | Comparative Example 4 | Comparative Example 5 |
|---|---|---|---|---|---|---|---|
| Resin composition | | Ultra high polyethylene | Content proportion (%) (Mw (×10³), f (≥1M)) | 40<br>2700, 46% | 2<br>2700, 46% | 0<br>2700, 46% | 30<br>2700, 46% |
| | | High density polyethylene | Content proportion (%) (Mw (×10³), f (≥1M)) | 60<br>260, 5.0% | 98<br>260, 5.0% | 100<br>260, 5.0% | 70<br>260, 5.0% |
| | | Solid content concentration (%) | | 23 | 40 | 30 | 30 |
| Stretching conditions | Stepwise biaxial stretching | MDO | Preheating temperature (° C.) | — | 115 | 110 | 117 |
| | | | Stretching temperature (° C.) | — | 123 | 108 | 117 |

TABLE 1-continued

|  |  |  |  |  |  |  |
|---|---|---|---|---|---|---|
|  |  | Thermal fixation temperature (° C.) | — | 50 | 80 | 50 |
|  |  | Magnification (times) | — | 8.2 (1.3 × 1.8 × 3.5) | 7.5 — | 8 — |
|  | TDO | Preheating temperature (° C.) | — | 114 | 124 | 117 |
|  |  | Stretching temperature (° C.) | — | 113 | 120 | 117 |
|  |  | Thermal fixation temperature (° C.) | — | 85 | 116 | 85 |
|  |  | Magnification (times) | — | 8.3 | 8.4→7 | 8 |
|  |  | Maximal deformation rate deviation (%/second) | — | — | — | 1 |
| Simultaneous biaxial stretching | Preheating temperature (° C.) |  | 115 | — | — | — |
|  | Stretching temperature (° C.) |  | 115 | — | — | — |
|  | Thermal fixation temperature (° C.) |  | 100 | — | — | — |
|  | Magnification (times) |  | 5 × 5 | — | — | — |
| Heat treatment | Temperature (° C.) |  | 127 | 132 | 129 | 125 |
|  | Magnification (times) |  | 1.4 | 1.7→1.6 | 1.45→1.2 | 1 |

TABLE 2

|  |  |  |  | Comparative Example 6 | Comparative Example 7 | Comparative Example 8 | Comparative Example 9 | Comparative Example 10 |
|---|---|---|---|---|---|---|---|---|
| Resin composition | Ultra high polyethylene | Content proportion (%) (Mw (×10³), f (≥1M)) |  | 30 2700, 46% | 20 2700, 46% | 30 2700, 46% | 30 2700, 46% | 30 2700, 46% |
|  | High density polyethylene | Content proportion (%) (Mw (×10³), f (≥1M)) |  | 70 260, 5.0% | 80 260, 5.0% | 70 260, 5.0% | 70 260, 5.0% | 70 260, 5.0% |
|  | Solid content concentration (%) |  |  | 30 | 30 | 30 | 30 | 30 |
| Stretching conditions | Stepwise biaxial stretching | MDO | Preheating temperature (° C.) | 80 | 130 | 115 | 115 | 116 |
|  |  |  | Stretching temperature (° C.) | 85 | 135 | 123 | 123 | 116 |
|  |  |  | Thermal fixation temperature (° C.) | 50 | 50 | 50 | 50 | 50 |
|  |  |  | Magnification (times) | 8.2 (1.3 × 1.8 × 3.5) | 6.5 (1.87 × 1.87 × 1.87) | 8.2 (1.3 × 1.8 × 3.5) | 8.2 (1.3 × 1.8 × 3.5) | 6.51 (1.3 × 1.8 × 2.78) |
|  |  | TDO | Preheating temperature (° C.) | — | — | 85 | 125 | 120 |
|  |  |  | Stretching temperature (° C.) | — | — | 90 | 133 | 120 |
|  |  |  | Thermal fixation temperature (° C.) | — | — | 85 | 85 | 85 |
|  |  |  | Magnification (times) | — | — | 8.3 | 8.3 | 7.21 |
|  |  |  | Maximal deformation rate deviation (%/second) | — | — | 2 | 2 | 2 |
|  | Simultaneous biaxial stretching | Preheating temperature (° C.) |  | — | — | — | — | — |
|  |  | Stretching temperature (° C.) |  | — | — | — | — | — |
|  |  | Thermal fixation temperature (° C.) |  | — | — | — | — | — |
|  |  | Magnification (times) |  | — | — | — | — | — |
| Heat treatment | Temperature (° C.) |  |  | — | — | — | — | 132.5 |
|  | Magnification (times) |  |  | — | — | — | — | 1.61→1.56 |

|  |  |  |  | Comparative Example 11 | Comparative Example 12 | Comparative Example 13 | Comparative Example 14 |
|---|---|---|---|---|---|---|---|
| Resin composition | Ultra high polyethylene | Content proportion (%) (Mw (×10³), f (≥1M)) |  | 20 2700, 46% | 30 2700, 46% | 30 2700, 46% | 30 2700, 46% |
|  | High density polyethylene | Content proportion (%) (Mw (×10³), f (≥1M)) |  | 80 260, 5.0% | 70 260, 5.0% | 70 260, 5.0% | 70 260, 5.0% |
|  | Solid content concentration (%) |  |  | 30 | 30 | 30 | 30 |
| Stretching conditions | Stepwise biaxial stretching | MDO | Preheating temperature (° C.) | 115 | 115 | 115 | 115 |
|  |  |  | Stretching temperature (° C.) | 123 | 123 | 123 | 123 |

TABLE 2-continued

|  |  |  |  |  |  |
|---|---|---|---|---|---|
|  | Thermal fixation temperature (° C.) | 50 | 50 | 50 | 50 |
|  | Magnification (times) | 4.9 (1.3 × 1.5 × 2.5) | 8.2 (1.3 × 1.8 × 3.5) | 8.2 (1.3 × 1.8 × 3.5) | 9 (1.3 × 1.8 × 3.85) |
| TDO | Preheating temperature (° C.) | 114 | 114 | 114 | 111 |
|  | Stretching temperature (° C.) | 113 | 113 | 113 | 110 |
|  | Thermal fixation temperature (° C.) | 85 | 85 | 85 | 85 |
|  | Magnification (times) | 8.3 | 4.9 | 11 | 6.6 |
|  | Maximal deformation rate deviation (%/second) | 2 | 2 | 2 | 2 |
| Simultaneous biaxial stretching | Preheating temperature (° C.) | — | — | — | — |
|  | Stretching temperature (° C.) | — | — | — | — |
|  | Thermal fixation temperature (° C.) | — | — | — | — |
|  | Magnification (times) | — | — | — | — |
| Heat treatment | Temperature (° C.) | 132 | — | — | 132 |
|  | Magnification (times) | 1.7→1.6 | — | — | 1.34→1.27 |

TABLE 3

|  |  | Example 1 | Example 2 | Example 3 | Example 4 | Comparative Example 1 | Comparative Example 2 | Comparative Example 3 | Comparative Example 4 | Comparative Example 5 |
|---|---|---|---|---|---|---|---|---|---|---|
| Properties before pressurization test | Membrane thickness (μm) | 12 | 9 | 10.9 | 11.9 | 11.1 | 11.6 | 9 | 12 | 10 |
|  | Air resistance (sec/100 cm³) | 165 | 155 | 130 | 240 | 130 | 120 | 140 | 130 | 150 |
|  | Porosity (%) | 43.6 | 39.9 | 44.2 | 38.2 | 43.7 | 45.8 | 41.2 | 51.5 | 47.1 |
|  | Pin puncture strength (mN) | 5394 | 3727 | 4070 | 4913 | 3138 | 3432 | 3334 | 5394 | 4462 |
|  | Pin puncture strength corresponding to 12 μm (mN) | 5394 | 5001 | 4511 | 4952 | 3432 | 3530 | 4511 | 5394 | 5394 |
|  | Heat shrinkage rate at 105° C. (%) MD/TD | 2.8/4.8 | 3.9/3.8 | 3.4/2.9 | 3.0/3.0 | 6.4/1.2 | 5.3/5.1 | 2.2/3.5 | 1.4/2.4 | 9.5/9.8 |
|  | Tensile rupture strength (MPa) MD/TD | 256/219 | 252/229 | 211/178 | 224/189 | 127/135 | 128/164 | 159/222 | 207/257 | 208/251 |
|  | Tensile rupture elongation (%) MD/TD | 85/85 | 110/95 | 120/130 | 115/135 | 160/145 | 180/125 | 130/80 | 90/60 | 90/80 |
|  | Average tensile rupture elongation (%) | 85 | 102 | 125 | 125 | 152 | 150 | 100 | 74 | 85 |
|  | Maximal pore size (nm) | 49 | 55 | 53.5 | 44.5 | 50 | 50 | 80.5 | 85 | 45 |
|  | Average pore size (nm) | 34.5 | 39 | 30 | 27.5 | 32 | 33 | 56.5 | 57.5 | 30 |
|  | Impedance | 100% | 100% | 100% | 100% | 100% | 100% | 100% | 100% | 100% |
|  | SDT (° C.) | 139.8 | 138.8 | 139.2 | 138.2 | 137.2 | 137 | 138 | 142 | 139.2 |
|  | MDT (° C.) | 150.6 | 149.6 | 151.2 | 150.6 | 150.6 | 149.6 | 149 | 148 | 150.1 |
|  | MDT − SDT (° C.) | 10.8 | 10.8 | 12 | 12.4 | 13.4 | 12.6 | 11 | 6 | 10.9 |
|  | Submicron region [a] | L | L | L | L | 3D | 3D | L | L | — |
|  | Micron region [a] | 3D | 3D | 3D | 3D | 3D | 3D | L | L | — |
| After pressurization at 60° C. | Membrane thickness (μm) | 11 | 8.8 | 9.8 | 10.9 | 10.2 | 10.3 | 8.5 | 10.3 | — |
|  | Membrane thickness variation | 91% | 98% | 90% | 96% | 92% | 89% | 94% | 86% | — |
|  | Air resistance (sec/100 cm³) | 225 | 225 | 190 | 300 | 195 | 185 | 220 | 215 | — |
|  | Air resistance variation | 137% | 145% | 146% | 125% | 150% | 154% | 157% | 165% | — |
| After pressurization at 80° C. | Membrane thickness (μm) | 10.8 | 8.3 | 9.6 | 10.3 | 9.6 | 10.1 | 8.1 | 10.1 | — |
|  | Membrane thickness variation | 89% | 92% | 88% | 90% | 86% | 87% | 90% | 84% | — |
|  | Air resistance (sec/100 cm³) | 270 | 275 | 245 | 360 | 280 | 265 | 295 | 310 | — |
|  | Air resistance variation | 164% | 177% | 188% | 150% | 215% | 221% | 211% | 238% | — |
|  | Air resistance variation ratio of the ratio after pressurization at 60° C. | 120% | 122% | 129% | 120% | 144% | 143% | 134% | 144% | — |
|  | Impedance | 103% | 102% | 108% | 109% | 125% | 112% | 122% | 133% | — |
|  | Impedance retention test results [b] | ◉ | ○ | ◉ | ○ | ◉ | ◉ | ◉ | X | — |

[a] (L: Ladder-like structure, 3D: three-dimensional network structure),

[b] (◉: 60 seconds or more, ○: 45 seconds or more, Δ 30 seconds or more, X: less than 30 seconds, —: not reached)

TABLE 4

|  |  | Comparative Example 6 | Comparative Example 7 | Comparative Example 8 | Comparative Example 9 | Comparative Example 10 | Comparative Example 11 | Comparative Example 12 | Comparative Example 13 | Comparative Example 14 |
|---|---|---|---|---|---|---|---|---|---|---|
| Properties before pressurization test | Membrane thickness (μm) | — | — | — | — | 12.1 | — | — | — | 13 |
| | Air resistance (sec/100 cm³) | — | — | — | — | 120 | — | — | — | 240 |
| | Porosity (%) | — | — | — | — | 46.6 | — | — | — | 38 |
| | Pin puncture strength (mN) | — | — | — | — | 4903 | — | — | — | 4119 |
| | Pin puncture strength corresponding to 12 μm (mN) | — | — | — | — | 4805 | — | — | — | 3825 |
| | Heat shrinkage rate at 105° C. (%) MD/TD | — | — | — | — | 2.5/5.8 | — | — | — | 2.6/3.0 |
| | Tensile rupture strength (kPa) MD/TD | — | — | — | — | 260/178 | — | — | — | 213/150 |
| | Tensile rupture elongation (%) MD/TD | — | — | — | — | 100/110 | — | — | — | 75/140 |
| | Average tensile rupture elongation (%) | — | — | — | — | 105 | — | — | — | 100 |
| | Maximal pore size (nm) | — | — | — | — | 53 | — | — | — | 55 |
| | Average pore size (nm) | — | — | — | — | 38 | — | — | — | 36 |
| | Impedance | — | — | — | — | 100% | — | — | — | 100% |
| | SDT (° C.) | — | — | — | — | 142.5 | — | — | — | 138.1 |
| | MDT (° C.) | — | — | — | — | 150.4 | — | — | — | 150 |
| | MDT − SDT (° C.) | — | — | — | — | 7.9 | — | — | — | 11.9 |
| | Submicron region [a] | — | — | — | — | L | — | — | — | L |
| | Micron region [a] | — | — | — | — | L | — | — | — | L |
| After pressurization at 60° C. | Membrane thickness (μm) | — | — | — | — | — | — | — | — | 12.4 |
| | Membrane thickness variation | — | — | — | — | — | — | — | — | 0.95 |
| | Air resistance (sec/100 cm³) | — | — | — | — | — | — | — | — | 370 |
| | Air resistance variation | — | — | — | — | — | — | — | — | 154% |
| After pressurization at 80° C. | Membrane thickness (μm) | — | — | — | — | — | — | — | — | 11.8 |
| | Membrane thickness variation | — | — | — | — | — | — | — | — | 0.91 |
| | Air resistance (sec/100 cm³) | — | — | — | — | — | — | — | — | 500 |
| | Air resistance variation | — | — | — | — | — | — | — | — | 208% |
| | Air resistance variation ratio of the ratio after pressurization at 60° C. | — | — | — | — | — | — | — | — | 135% |
| | Impedance | — | — | — | — | — | — | — | — | 120% |
| | Impedance retention test results [b] | — | — | — | — | — | — | — | — | ◉ |

[a] (L: Ladder-like structure, 3D: three-dimensional network structure),

[b] (◉: 60 seconds or more, ○: 45 seconds or more, Δ30 seconds or more, X: less than 30 seconds, —: not reached)

The invention claimed is:

1. A microporous membrane, wherein average membrane thickness is 15 μm or less, air resistance is 400 seconds or less, pin puncture strength corresponding to a membrane thickness of 12 μm is 4000 mN or more, and air resistance variation (60° C.) after a pressurization treatment under conditions of 60° C., 4 MPa, and 10 minutes is 148% or less: wherein Air resistance variation (60° C.)=air resistance after the pressurization treatment at 60° C./air resistance prior to the pressurization treatment×100.

2. The microporous membrane according to claim 1, wherein said air resistance variation is 145% or less.

3. The microporous membrane according to claim 1, wherein the air resistance variation (80° C.) after a pressurization treatment under conditions of 80° C., 4 MPa, and 10 minutes is 200% or less: wherein Air resistance variation (80° C.)=air resistance after the pressurization treatment at 80° C./air resistance prior to the pressurization treatment×100.

4. The microporous membrane according to claim 3, wherein said air resistance variation (80° C.) is 190% or less.

5. The microporous membrane according to claim 1, wherein pin puncture strength corresponding to the membrane thickness of 12 μm is 4000 mN or more, heat shrinkage rate after an exposure at 105° C. for 8 hours is 5% or less, and average tensile rupture elongation is 130% or less.

6. The microporous membrane according to claim 1, wherein at least one of the following is satisfied: the shutdown temperature is 140° C. or less, and the temperature difference between the shutdown temperature and the meltdown temperature obtained by a temperature-increasing air permeability method is 10° C. or more.

7. The microporous membrane according to claim 1, wherein average pore size is 0.1 μm or less.

8. The microporous membrane according to claim 1, comprising 2% or more of an ultra high molecular weight polyethylene component having a weight average molecular weight of 1,000,000 or more, or 5% or more of a molecule component having a weight average molecular weight of 1,000,000 or more.

9. The microporous membrane according to claim 1, wherein formation of a hybrid structure of a ladder structure in a submicron region and a three-dimensional network structure in a micron region is observed on at least one surface of the microporous membrane.

10. A lithium ion secondary battery, wherein the microporous membrane according to claim 1 is used.

* * * * *